(12) United States Patent
Abdalla et al.

(10) Patent No.: US 12,540,709 B2
(45) Date of Patent: Feb. 3, 2026

(54) METHODS OF MONITORING AND CONTROLLING LIQUID NATURAL GAS (LNG) TANKS ABOARD A MARINE VESSEL

(71) Applicant: NFE Patent Holdings LLC, New York, NY (US)

(72) Inventors: Ossama Abdalla, Miami, FL (US); Pedro Pereira, Miami, FL (US); Captain Mark Lane, Miami, FL (US)

(73) Assignee: NFE Patent Holdings LLC, New York, NY (US)

( * ) Notice: Subject to any disclaimer, the term of this patent is extended or adjusted under 35 U.S.C. 154(b) by 1161 days.

(21) Appl. No.: 17/466,769

(22) Filed: Sep. 3, 2021

(65) Prior Publication Data

US 2023/0069944 A1    Mar. 9, 2023

(51) Int. Cl.
*F17C 13/02* (2006.01)
*F17C 6/00* (2006.01)
*F17C 13/04* (2006.01)

(52) U.S. Cl.
CPC .............. *F17C 13/02* (2013.01); *F17C 6/00* (2013.01); *F17C 13/04* (2013.01);
(Continued)

(58) Field of Classification Search
CPC .. F17C 13/02; F17C 6/00; F17C 13/04; F17C 2205/0134; F17C 2205/0326;
(Continued)

(56) References Cited

U.S. PATENT DOCUMENTS

| 4,372,340 A | * | 2/1983 | Rothrock | ............... F17C 3/022 |
| | | | | 137/395 |
| 8,375,876 B2 | | 2/2013 | Van Tassel | |

(Continued)

FOREIGN PATENT DOCUMENTS

| CA | 2299755 C | * | 1/2009 | ............ B60P 3/2205 |
| CA | 2876467 A1 | * | 9/2014 | ............. B60P 3/228 |

(Continued)

OTHER PUBLICATIONS

PCT International Search Report and Written Opinion issued in International Application No. PCT/US2022/075935, dated Feb. 2, 2023.

(Continued)

*Primary Examiner* — Joel M Attey
*Assistant Examiner* — Ibrahim A. Michael Adeniji
(74) *Attorney, Agent, or Firm* — Norton Rose Fulbright US LLP

(57) ABSTRACT

Methods of, and control systems for, operating modular, liquid natural gas (LNG) manifold apparatuses, crossover systems for such modular manifold apparatuses, and systems including one or more of the modular manifold apparatuses and a plurality of ISO tank containers. The modular manifold apparatus includes an ISO container (e.g., an open-frame ISO container) with a plurality of container connection sections or bays, a liquid system, and a vent system, where each of the liquid and vent systems includes a header and a plurality of connection lines configured to be coupled to the respective liquid and vent connections of LNG containers adjacent the modular manifold apparatus.

6 Claims, 35 Drawing Sheets

(52) U.S. Cl.
CPC ............... *F17C 2205/0134* (2013.01); *F17C 2205/0326* (2013.01); *F17C 2205/0332* (2013.01); *F17C 2221/033* (2013.01); *F17C 2223/0161* (2013.01); *F17C 2227/0337* (2013.01); *F17C 2250/032* (2013.01); *F17C 2250/0417* (2013.01); *F17C 2250/043* (2013.01); *F17C 2270/0105* (2013.01)

(58) Field of Classification Search
CPC ........ F17C 2205/0332; F17C 2221/033; F17C 2223/0161; F17C 2227/0337; F17C 2250/032; F17C 2250/0417; F17C 2250/043; F17C 2270/0105; F17C 2201/0109; F17C 2201/035; F17C 2201/054; F17C 2205/0169; F17C 13/08; F17C 2205/0107; F17C 2205/0146; F17C 2205/0329; F17C 2205/0352; F17C 2205/037; F17C 2223/033; F17C 2227/046; F17C 2250/036; F17C 2250/0491; F17C 2250/0615; F17C 2250/0626; F17C 2265/06; F17C 2270/0113
See application file for complete search history.

(56) References Cited

U.S. PATENT DOCUMENTS

| | | | |
|---|---|---|---|
| 10,082,416 B1 * | 9/2018 | Lease | F17C 11/007 |
| 10,919,757 B1 | 2/2021 | Mermiris et al. | |
| 2005/0056090 A1 * | 3/2005 | McSheffrey, Jr. | G01F 23/804 73/314 |
| 2008/0164251 A1 * | 7/2008 | Fawley | F17C 13/084 414/800 |
| 2012/0137955 A1 * | 6/2012 | Van Tassel | B63B 25/004 62/48.1 |
| 2018/0312235 A1 * | 11/2018 | Xu | F02M 21/0218 |
| 2019/0041004 A1 * | 2/2019 | Krueger | F17C 6/00 |
| 2019/0186663 A1 | 6/2019 | Bryngelson et al. | |
| 2020/0149684 A1 * | 5/2020 | Bernhardt | F25J 1/001 |
| 2021/0317954 A1 * | 10/2021 | Mermiris | B67D 9/00 |
| 2022/0298003 A1 | 9/2022 | Mermiris et al. | |

FOREIGN PATENT DOCUMENTS

| | | |
|---|---|---|
| CN | 103237743 | 8/2013 |
| FR | 2 811 752 | 1/2002 |
| KR | 100935643 | 1/2010 |
| WO | WO 2010120908 | 10/2010 |
| WO | WO 2017/074261 | 5/2017 |
| WO | WO 2019/029005 | 2/2019 |

OTHER PUBLICATIONS

PCT Invitation to Pay Additional Fees issued in International Application No. PCT/US2022/075935, dated Dec. 8, 2022.

* cited by examiner

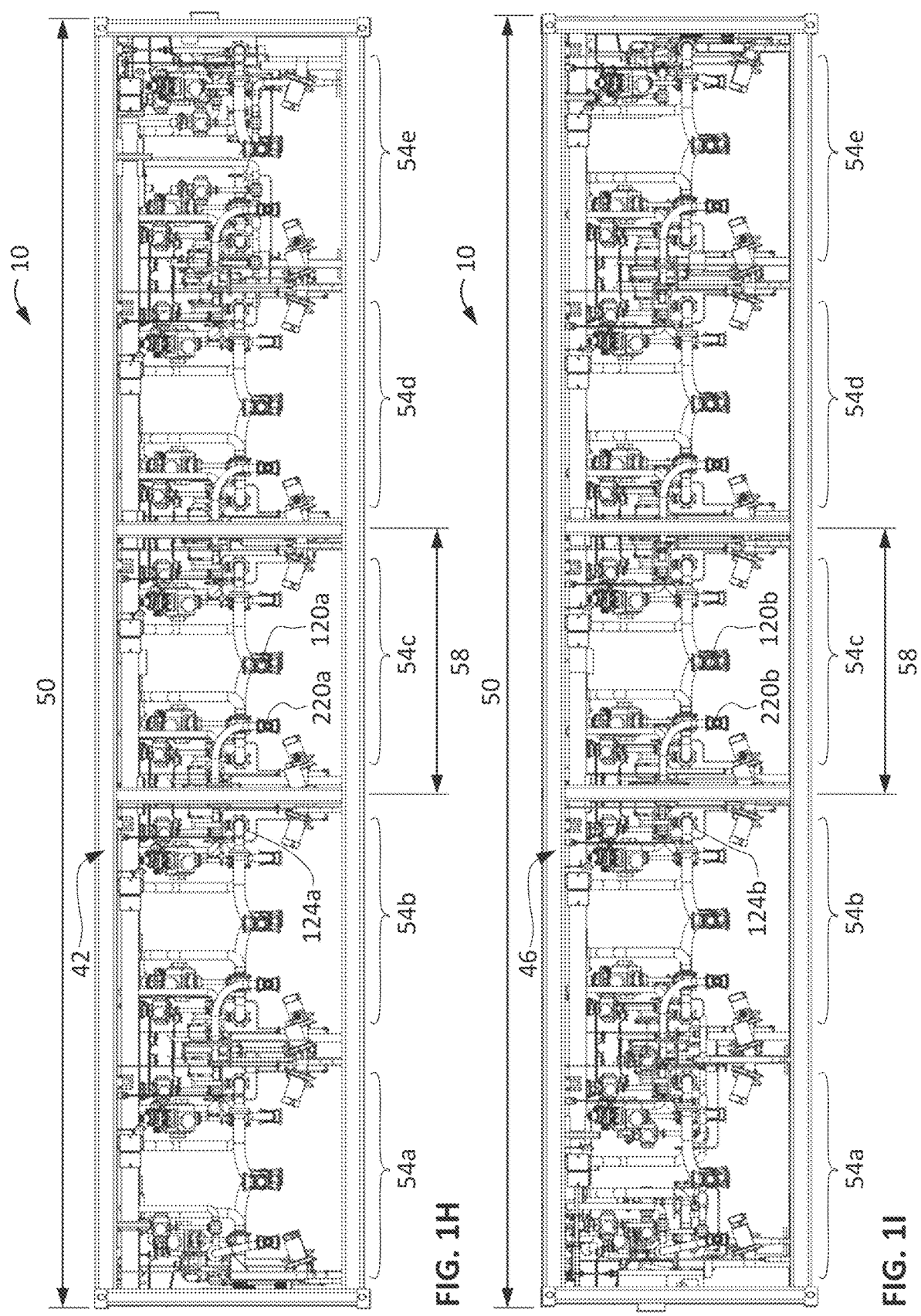

| FIG. 5A-1 | FIG. 5A-2 |
| FIG. 5A-3 | FIG. 5A-4 |

METHODS OF MONITORING AND CONTROLLING LIQUID NATURAL GAS (LNG) TANKS ABOARD A MARINE VESSEL

FIELD OF DISCLOSURE

The present disclosure generally relates to intermodal transportation of liquids, and, more particularly but not by way of limitation, ISO container systems for intermodal transportation of liquids such as liquid natural gas (LNG).

BACKGROUND

U.S. Pat. No. 8,375,876 (the '876 Patent) discloses a "system and method for containerized transport of liquids by marine vessel." The '876 Patent explains in its Background of the Invention section that:

A traditional role for LNG is the transportation of large volumes of natural gas over long distance ocean routes. The natural gas is liquefied to a cryogenic liquid at a location near the gas source, often in remote areas. The LNG is then loaded in large, specialized tankers for the ocean transit to the destination or regasification facility. At the destination facility, the LNG is unloaded from the tanker to tanks on shore. From the shore based tank storage, the LNG is then increased in pressure to the required downstream pressure and re-gasified and consumed at or near the destination facility or distributed to the end user by conventional pipeline. Although an efficient transportation system and method to deliver natural gas from remote sources of supply, this system does not provide for the efficient distribution of LNG as an energy dense liquid fuel to the transportation and power generation industries.

To address these issues, the '876 Patent discloses ways to "enable existing LNG terminals—liquefaction, regasification or other—in various locations throughout the world, to connect commercially to the extensive intermodal transportation systems throughout the world to implement safe and reliable LNG fuel supply distribution networks" using intermodal LNG tanks.

SUMMARY

The present disclosure includes apparatuses, systems, methods that further enable and enhance the intermodal transportation of liquid natural gas (LNG). For example, a traditional liquefied natural gas ("LNG") vessel can serve as a floating storage unit ("FSU") or floating storage and regasification unit ("FSRU"), on which LNG is stored in bulk reservoirs. These vessels may be moored to offshore sea islands, berths near shore, or in an established anchorage, for example, near a market access point where the LNG cargo can be monetized, with limited interruption, by using smaller liquefied natural gas carriers ("LNGC") to shuttle cargo from the FSU or FSRU to ports where the existing port infrastructure is not designed to handle full-scale LNG carriers, the port is too shallow, or the location is too remote from established maritime activities.

Another way the FSU/FSRU vessels can facilitate distribution is by 'breaking bulk' or transferring the bulk LNG from the FSU/FSRU to smaller parcels of LNG that can be distributed to various distributors and consumers who do not have access to the floating terminal and bulk infrastructure. By way of example, ISO tank containers—e.g., 40-foot ISO tank containers, can be carried on the deck of smaller vessels—e.g., an offshore service vessel ("OSV") or barge—and filled with LNG from an FSU/FSRU. The use of standardized ISO tank containers facilitates the securement of the ISO tank containers on the deck of the OSV or barge via known connector systems, such as cell guides and/or twist-locks similar to those employed on container vessels for other purposes.

The LNG ISO tank containers can 'batch-filled' while on board an OSV vessel through ship-to-ship transfer of LNG cargo from the FSU/FSRU to the OSV vessel through an LNG transloading system. The OSV vessel can then transport the loaded ISO tank containers from the FSU/FSRU site to a berth in a nearby port, lifted off the vessel, and discharged to shore for transport by trailer-truck chassis or rail car to downstream consumers.

The present modular manifold apparatuses facilitate the retrofitting and/or assembly of marine vessels to function as OSV vessels for filling, and shallow-water delivery, of ISO tank containers. For example, the present modular manifold apparatuses can be configured to include all piping and connections necessary to connect primary LNG, vent, drain, and/or pneumatic lines of the vessel to a plurality of ISO tank containers (e.g., 5 or 10 ISO tank containers). As such, the present modular manifold apparatuses can be built on-shore, such as in a factory setting, and then delivered to a vessel, rapidly secured via cell guides or twist-locks, and rapidly connected to the vessels LNG, vent, drain, and/or pneumatic lines of the vessel. Additionally, the present modular manifold apparatuses can include sensor and control lines for connected ISO tank containers, and can include a control panel that is configured to function as a "slave" to a "master" controller of a vessel, such that the modular manifold apparatus can relatively simply be connected to a power connection on board the vessel and a communication line to the "master" controller of the vessel. In this way, the present modular manifold apparatuses greatly simplify the retrofitting or assembly of marine vessels to serve as OSV vessels, by greatly reducing the need to install on the vessel the container-level piping and valves to control distribution of LNG to the ISO tank containers.

The present modular manifold apparatuses also facilitate repair and maintenance of such an OSV vessel by facilitating the rapid removal and replacement of each modular manifold apparatus. For example, if one of the modular manifold apparatuses develops a leak or valve failure that requires repair, rather than a lengthy repair on board the vessel that would otherwise reduce the LNG capacity of the vessel (by preventing use of certain ISO tank containers with the affected modular manifold apparatus) or take the vessel out of service for repair, the affected modular manifold apparatus can simply be removed and replaced with a similar modular manifold apparatus. The affected modular manifold apparatus can then be repaired on shore with the operation of the OSV vessel de-coupled from the duration or complexity of repairs required for the removed modular manifold apparatus, increasing uptime of the OSV vessel.

Some embodiments of the present methods are for monitoring liquid natural gas (LNG) fill levels in at least first and second pluralities of ISO tank containers on a marine vessel having a central computer system, where each plurality of ISO tank containers is connected to a respective LNG manifold apparatus having a control panel, a plurality of liquid connections, a plurality of vent connections, and a plurality of sensor lines in electrical communication with the control panel, each ISO tank container has liquid and vent connections that are connected to corresponding liquid and vent connections of the respective LNG manifold apparatus, and each ISO tank container further having at least a first upper pressure sensor and a first lower pressure sensor connected to corresponding sensor lines of the respective LNG manifold apparatus, where the control panels is in electrical communication with the central computer system via a respective communication line. Some such methods comprise: during simultaneous filling of the plurality of ISO tank containers, receiving at a central computer system via the communication lines sensor signals from the first upper and lower pressure sensors of each of at least a portion of the first plurality of ISO tank containers and from the first upper and lower pressure sensors of each of at least a portion of the second plurality of ISO tank containers; and determining from the sensor signals a fill level in each of the ISO tank containers for which sensor signals are received. Some such methods further comprise: comparing the determined fill levels of the ISO tank containers to identify any mismatches in fill levels that exceed a threshold value. Some such methods further comprise adjusting one or more valves of the apparatus(es) to alter relative flowrates between containers between which a mismatch is identified.

Some embodiments of the present methods are for simultaneously filling at least first and second pluralities of ISO tank containers on a marine vessel with liquid natural gas (LNG), where the vessel has a central computer system, each plurality of ISO tank containers connected to a respective LNG manifold apparatus having a control panel, a plurality of liquid connections, a plurality of vent connections, the liquid and vent connections being connected to corresponding liquid and vent connections of the respective LNG manifold apparatus, each of the control panels is in electrical communication with the central computer system via a respective communication line, each LNG manifold apparatus includes a plurality of variable shutoff valves each configured to throttle flow through one of the liquid connections of the LNG manifold apparatus, and the variable shutoff valves are coupled to the corresponding control panel via valve control lines and are remotely actuatable via control signals received through the control panel. Some such methods comprise: sending control signals from the central computer system to either or both of: the variable shutoff valve corresponding to a first one of the ISO tank containers and/or variable shutoff valve corresponding a second one of the ISO tank containers to vary one or more of the respective shutoff valves and thereby reduce flow into the first ISO tank container relative to flow into the second ISO tank container; and/or the vent shutoff valves corresponding to a first one of the ISO tank containers and/or the vent shutoff valve corresponding to a second one of the ISO tank containers to close one or more of the respective shutoff valves and thereby maintain or increase pressure in the second ISO tank container and reduce flow into the first ISO tank container relative to flow into the second ISO tank container. In some such methods, sending the control signals is performed in response to determining that a fill level difference between the first ISO tank container and the second ISO tank container exceeds a threshold value.

Some embodiments of the present methods are for cooling liquid and vent connections a plurality of liquid natural gas (LNG) manifold apparatuses connected to ISO tank containers on a marine vessel, where the vessel having a central computer system, each of the LNG manifold apparatuses having a control panel, a liquid header with a plurality of liquid connections, a vent header with a plurality of vent connections, and a crossover circuit in fluid communication with the liquid header and the vent header, the liquid and vent connections being connected to corresponding liquid and vent connections of respective ones of the ISO tank containers, each of the control panels is in electrical communication with the central computer system via a respective communication line, the crossover circuit includes one or more crossover valves for permitting or preventing fluid communication between the liquid header and the vent header, and the crossover valve(s) are coupled to the corresponding control panel via valve control lines and are remotely openable via control signals received through the control panel. Some such methods comprise: sending a control signal from the central computer system to the crossover valve(s) of one or more of the LNG manifold apparatuses to open the crossover valve(s) and permit fluid communication between the liquid header and the vent header of the respective LNG manifold apparatus. Some such methods further comprise: simultaneously filling with a cooling fluid (e.g., natural gas) the liquid header and the vent header of the LNG manifold apparatuses for which the crossover valves are open.

Some of the present methods are for cooling liquid and vent connections a plurality of liquid natural gas (LNG) manifold apparatuses connected to ISO tank containers on a marine vessel, where the vessel has a central computer system, each of the LNG manifold apparatuses having a control panel, a liquid header with a plurality of liquid connections, a vent header with a plurality of vent connections, a drain header, and a crossover circuit in fluid communication with the liquid header and the drain header, the liquid and vent connections being connected to corresponding liquid and vent connections of respective ones of the ISO tank containers, each of the control panels is in electrical communication with the central computer system via a respective communication line, the crossover circuit includes one or more crossover valves for permitting or preventing fluid communication between the liquid header and the drain header, and the crossover valve(s) are coupled to the corresponding control panel via valve control lines and are remotely openable via control signals received through the control panel. Some such methods comprise: sending a control signal from the central computer system to the crossover valve(s) of an LNG manifold apparatuses to open the crossover valve(s) and permit fluid communication between the liquid header and the drain header of the LNG manifold apparatus.

Additional embodiments are described below in the Detailed Description and Representative Embodiments sections of this disclosure.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any embodiment of the present apparatuses, kits, and methods, the term "substantially" may be substituted with "within [a percentage] of" what is specified, where the percentage includes 0.1, 1, 5, and/or 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus or kit that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, an apparatus, device or system that is configured in a certain way is configured in at least that way, but it can also be configured in other ways than those specifically described.

Any embodiment of any of the present apparatuses and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

Some details associated with the aspects of the present disclosure are described above, and others are described below. Other implementations, advantages, and features of the present disclosure will become apparent after review of the entire application, including the Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical labels or reference numbers do not necessarily indicate an identical structure. Rather, the same reference number may be used to indicate a similar feature or a feature with similar functionality, as may non-identical reference numbers. Dimensioned figures are drawn to scale (unless otherwise noted), meaning the sizes of the depicted elements are accurate relative to each other for at least the embodiment depicted in the figures.

FIG. 1H depicts a first side view of the apparatus of FIG. 1A.

FIG. 1I depicts a second side view of the apparatus of FIG. 1A.

DETAILED DESCRIPTION OF ILLUSTRATIVE EMBODIMENTS

Figure 4A:
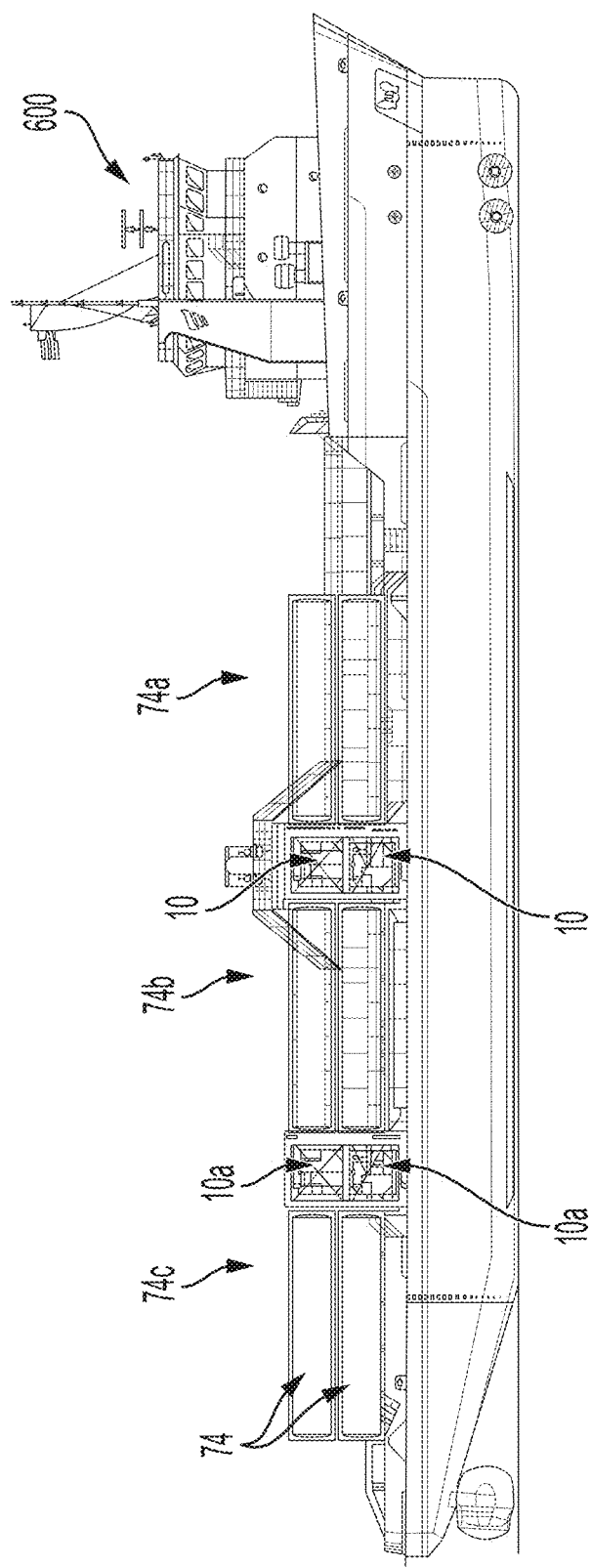
FIG. 4A is a starboard side view of a first example of a marine vessel carrying a plurality of the apparatus of FIG. 1 and a plurality of ISO tank containers.
Figure 4B:
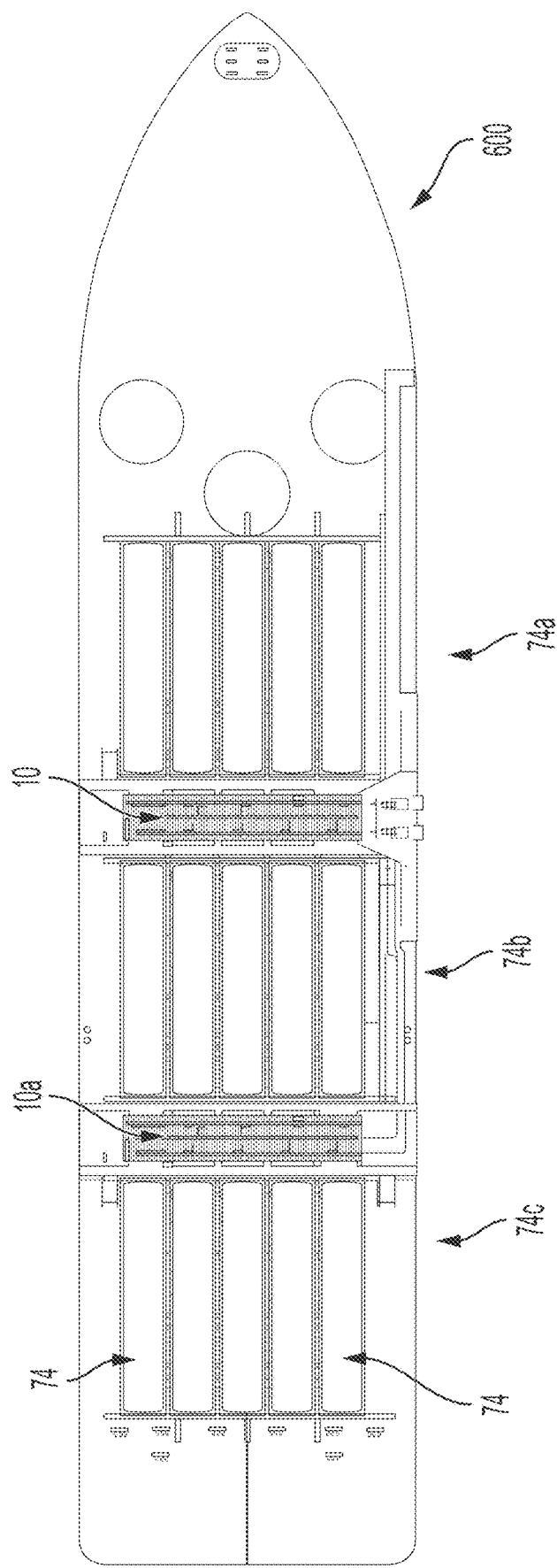
FIG. 4B is a top plan view of the marine vessel of FIG. 4A.
Figure 4C:
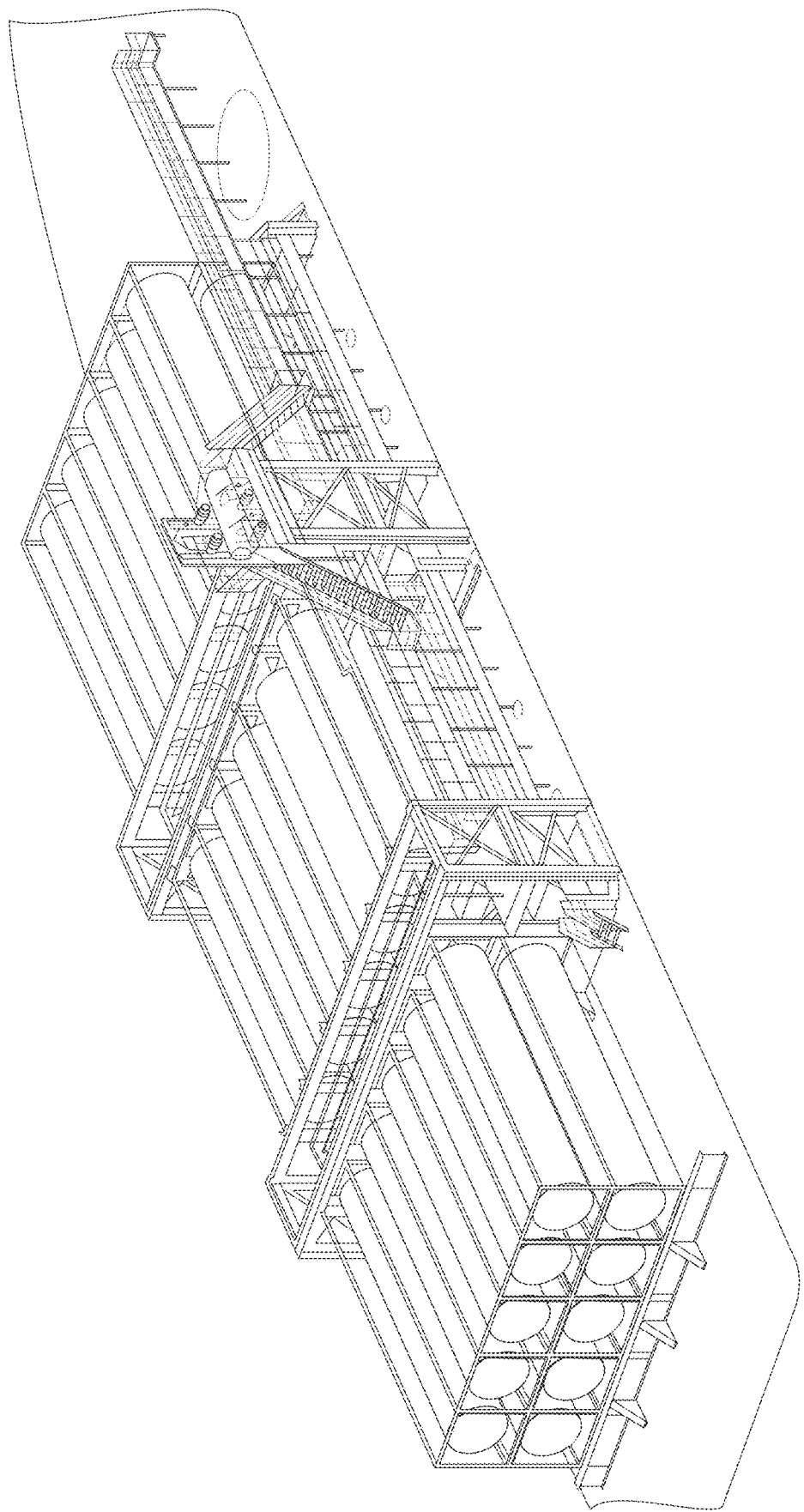
FIG. 4C is an enlarged perspective view of the apparatuses and ISO tank containers on an upper deck of the marine vessel of FIG. 4A.
Figures 1, 5A:
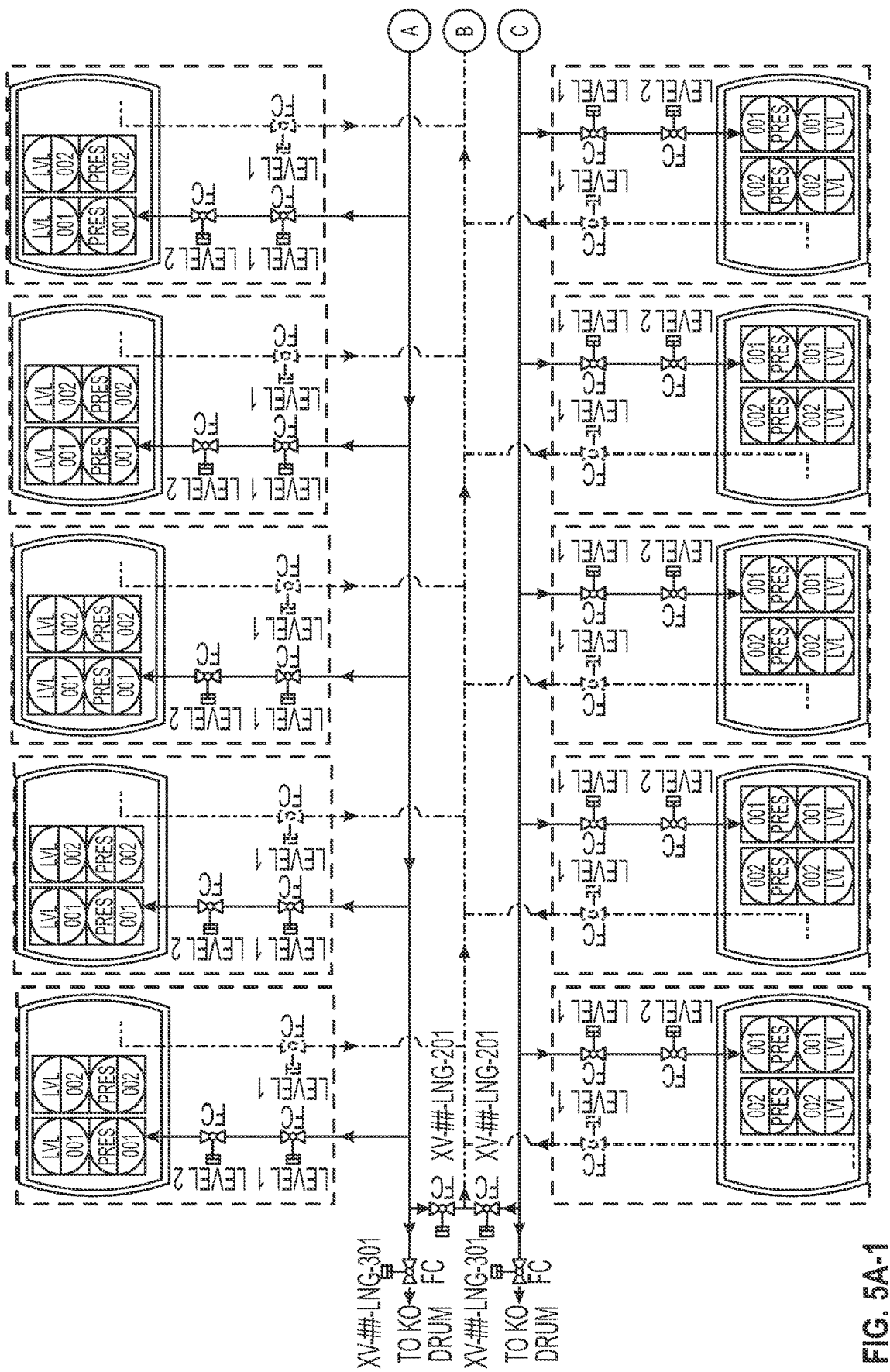
FIG. 5A depicts a piping diagram of a single level of the apparatuses and ISO tank containers, and corresponding connections to a hose tower and knock-out drum/tank of the vessel, of FIGS. 4A-4C.
Figures 2, 5A:
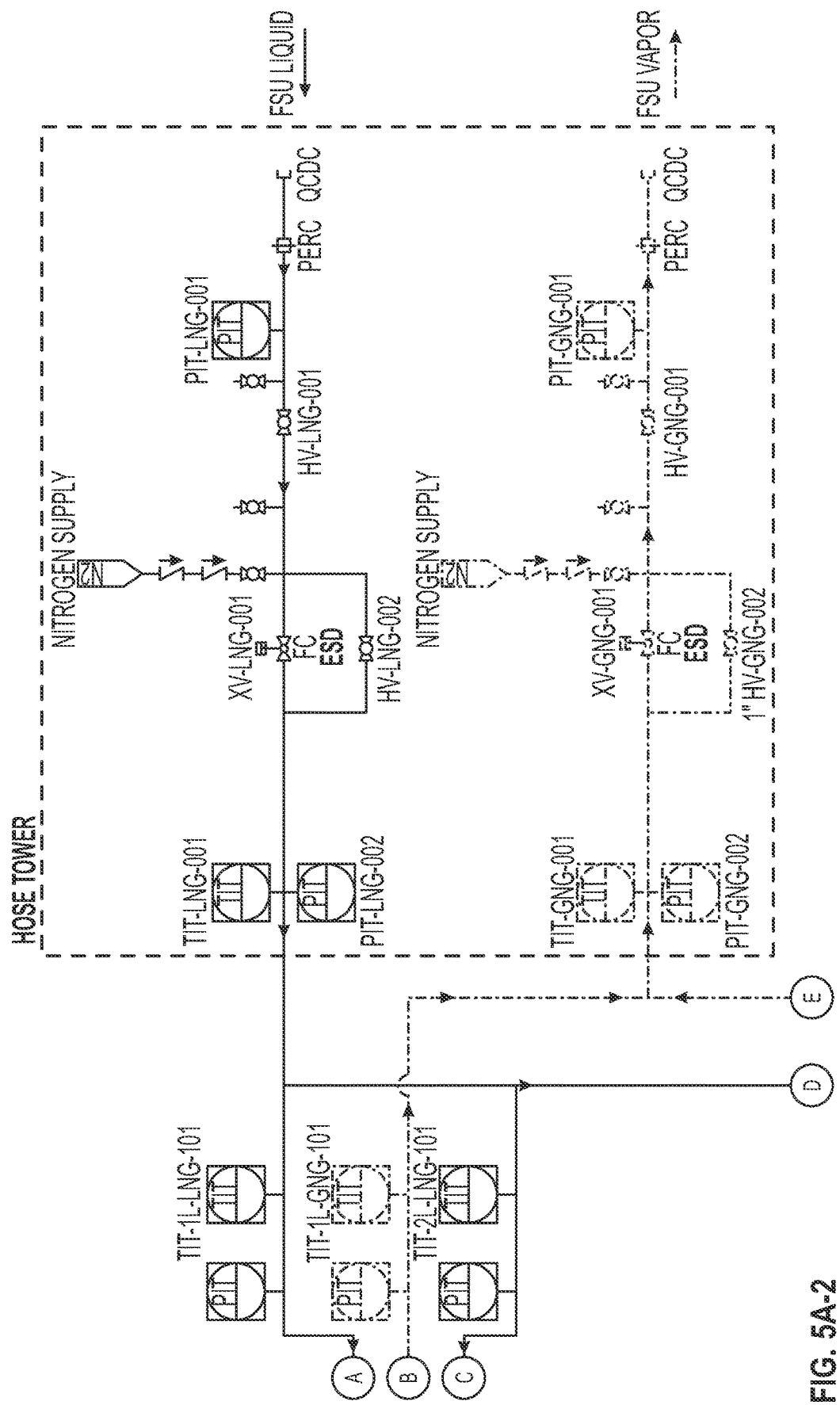
Figures 3, 5A:
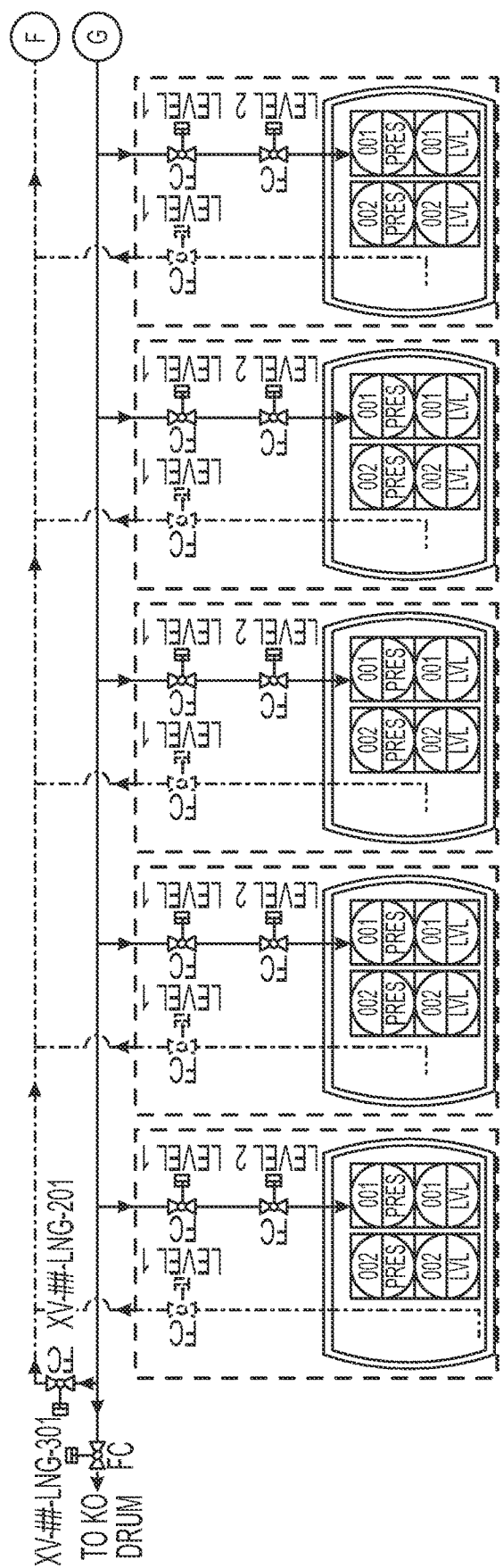
Figure 5A:
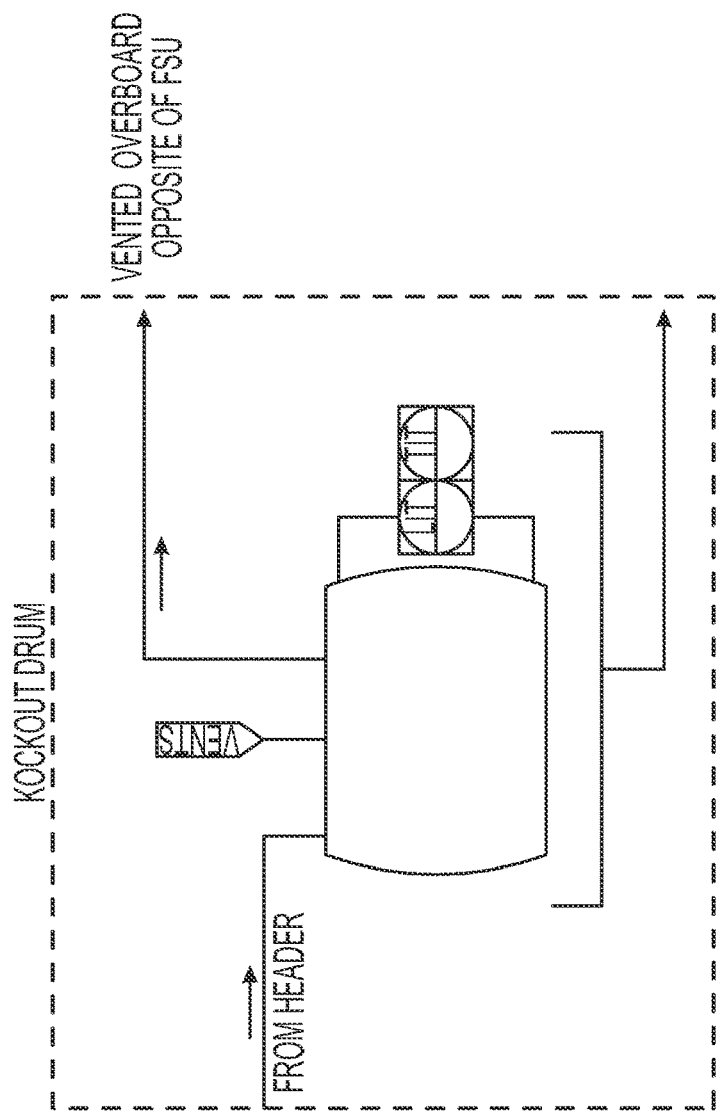
Figure 4:
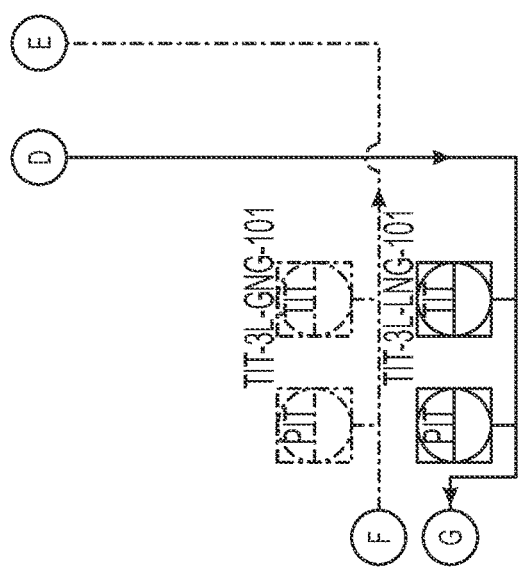
Figures 1, 5B:
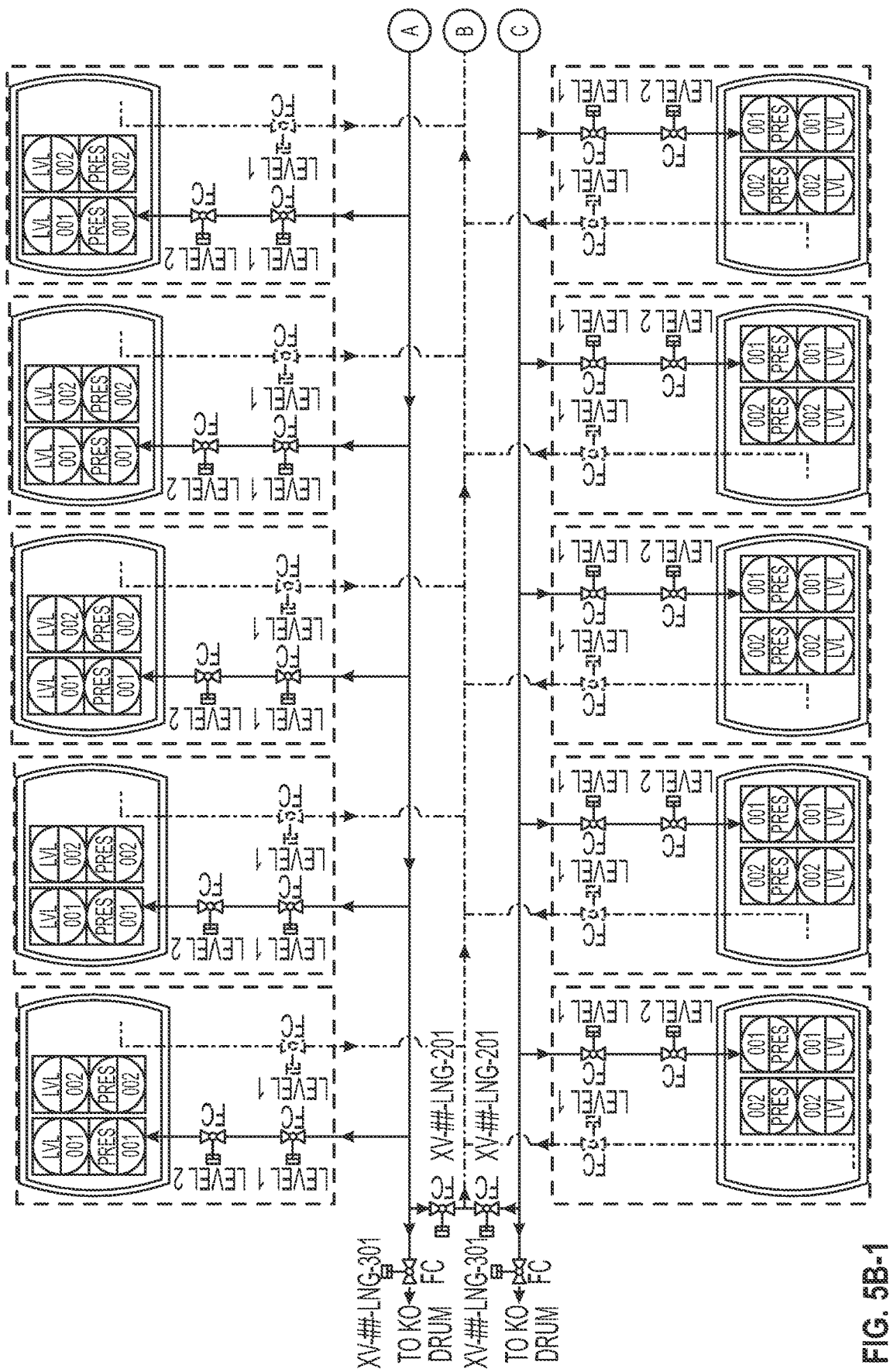
FIG. 5B depicts an enlarged view of an apparatuses and ISO tank containers portion of the diagram of FIG. 5A.
Figures 2, 5B:
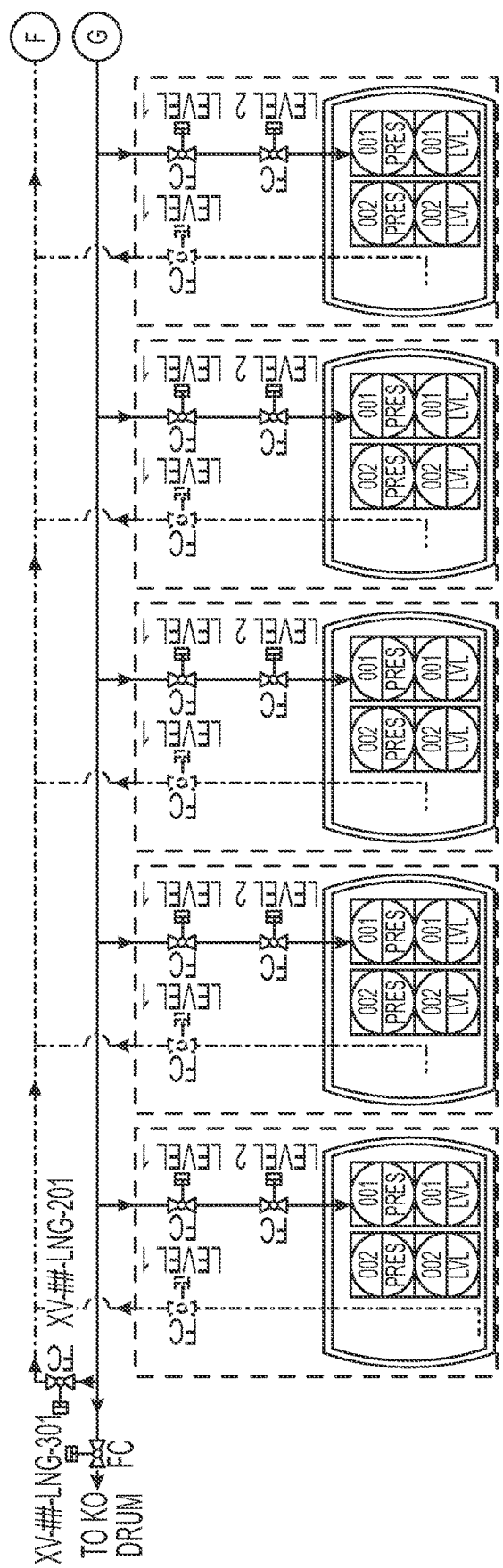
Figures 3, 5B:
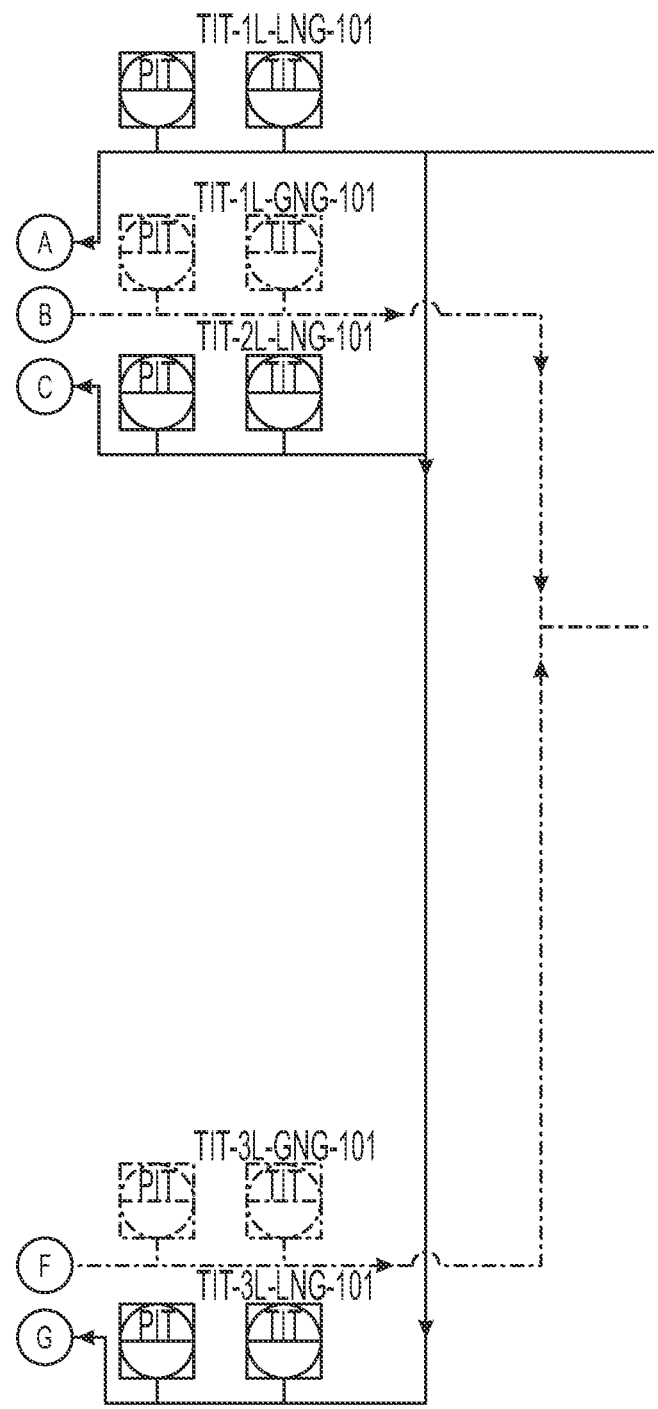
Figure 5C:
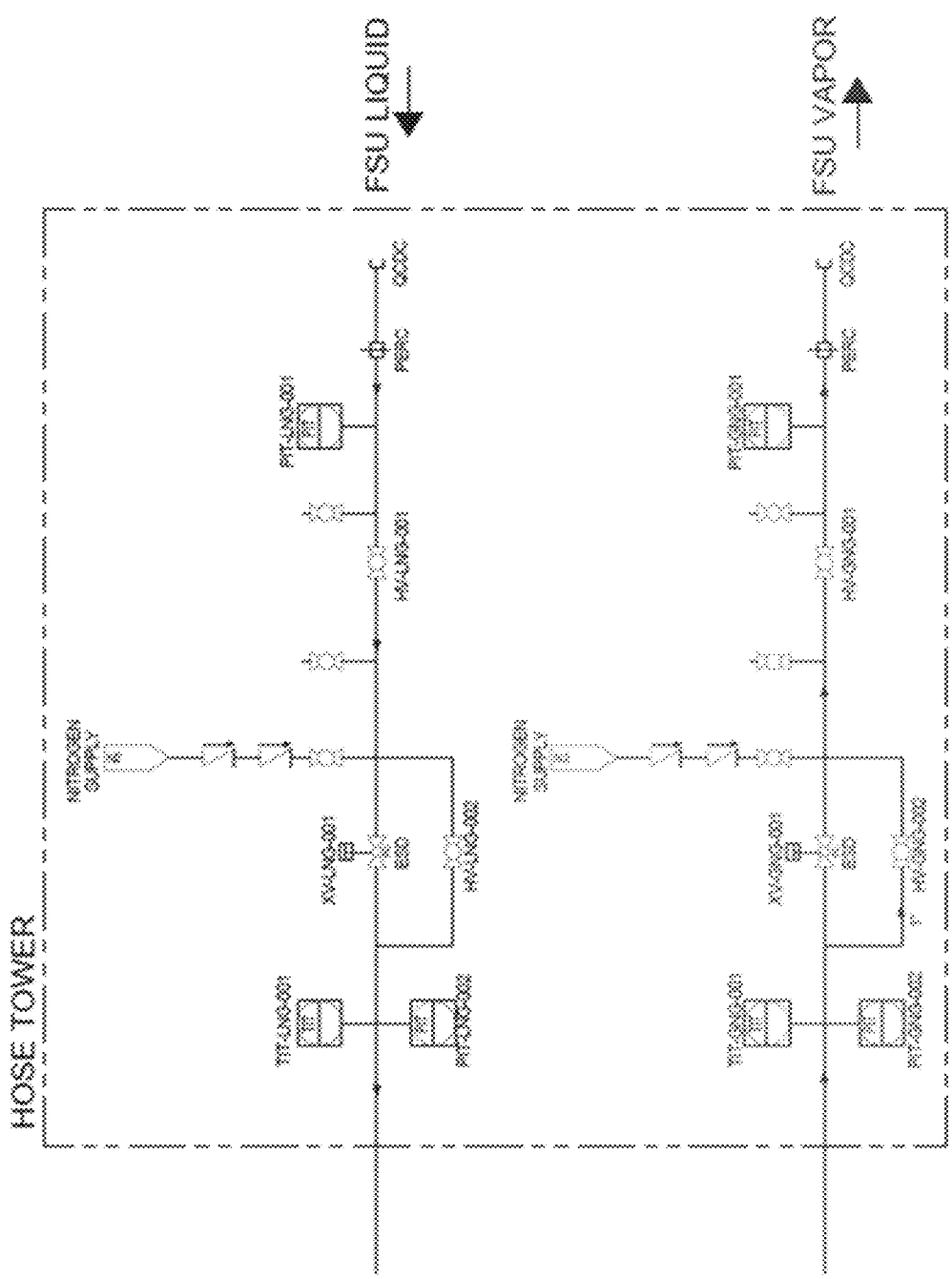
FIG. 5C depicts an enlarged view of the hose tower portion of the diagram of FIG. 5A.
Figure 5E:
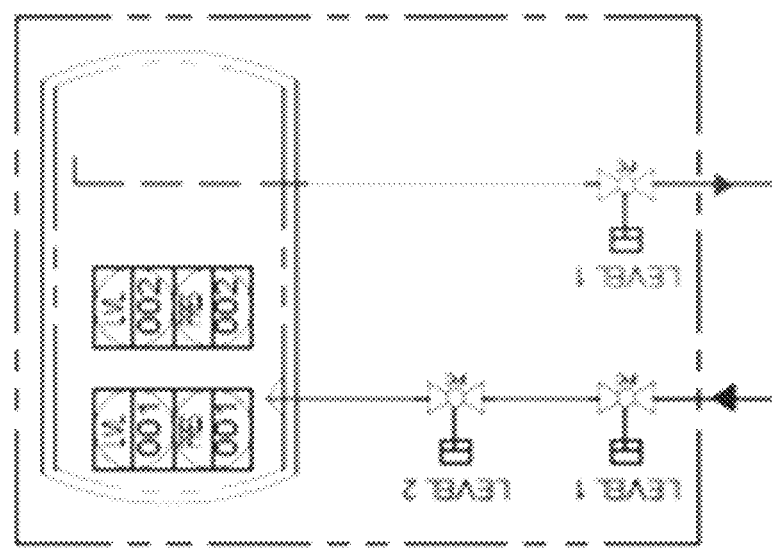
FIG. 5E depicts an enlarged view of a single ISO tank container portion of the diagram of FIG. 5A.
Figure 5D:
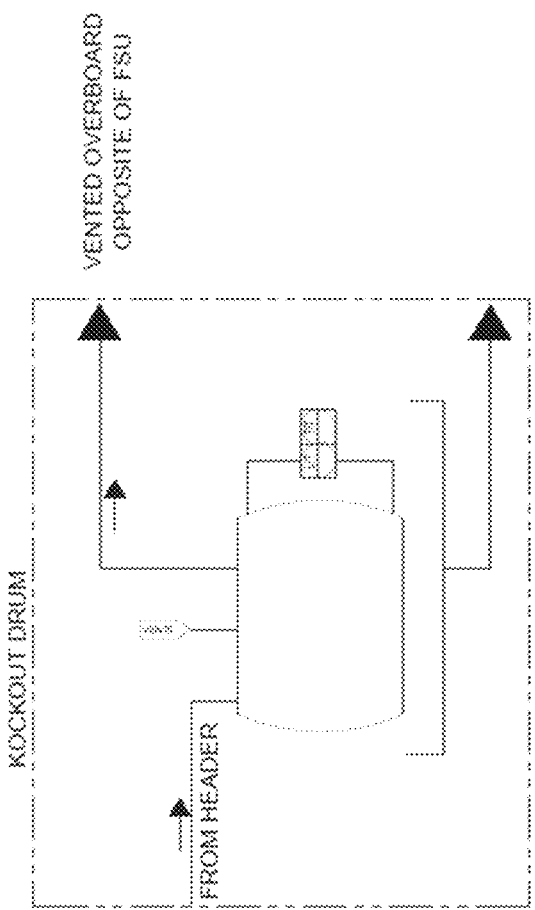
FIG. 5D depicts an enlarged view of a knockout drunk/tank portion of the diagram of FIG. 5A.

Referring now to the drawings, and more particularly to FIGS. 1A-1I, shown there and designated by the reference numeral 10 is an embodiment of the present modular, liquid natural gas (LNG) manifold apparatuses. Apparatus 10 is configured in an ISO container format such as is used for intermodal shipping, such as by marine vessel, truck, train, and the like. More particularly, apparatus 10 comprises an ISO container 14 that includes a frame 18. In this embodiment, the ISO container is in the form of a frame that is open on the sides and top. In other embodiments, the ISO container can be enclosed on the top and/or one or more of its sides. As shown, ISO container 14 has a bottom 22, a top 26, first and second ends 30, 34 each having a common width 38, and first and second sides 42, 46 each having a common length 50 that is greater than the width. As will be appreciated by those of ordinary skill in the art, width 46 of the ISO container is nominally 8 feet, and length 50 is a nominal multiple of 8 feet such that the length includes a plurality of sections 54a, 54b, 54c, 54d, 54e that each has a nominal section length 58 of 8 feet. These sections can be considered tank connection bays in that each includes liquid and vent connections, as described in more detail below, for connecting the manifold apparatus to respective ISO tanks to allow the tanks to be filled and/or emptied via the manifold apparatus. In some embodiments, such as the one shown, ISO container 14 is configured to support at least its own weight, such that two of apparatus 10 can be stacked vertically one on top of the other. In some such embodiments, ISO container 14 is configured to support at least two times its own weight, such that three of apparatus 10 can be stacked vertically one on top of the other, such as is described below with reference to FIGS. 4A-5.

Figure 1A:
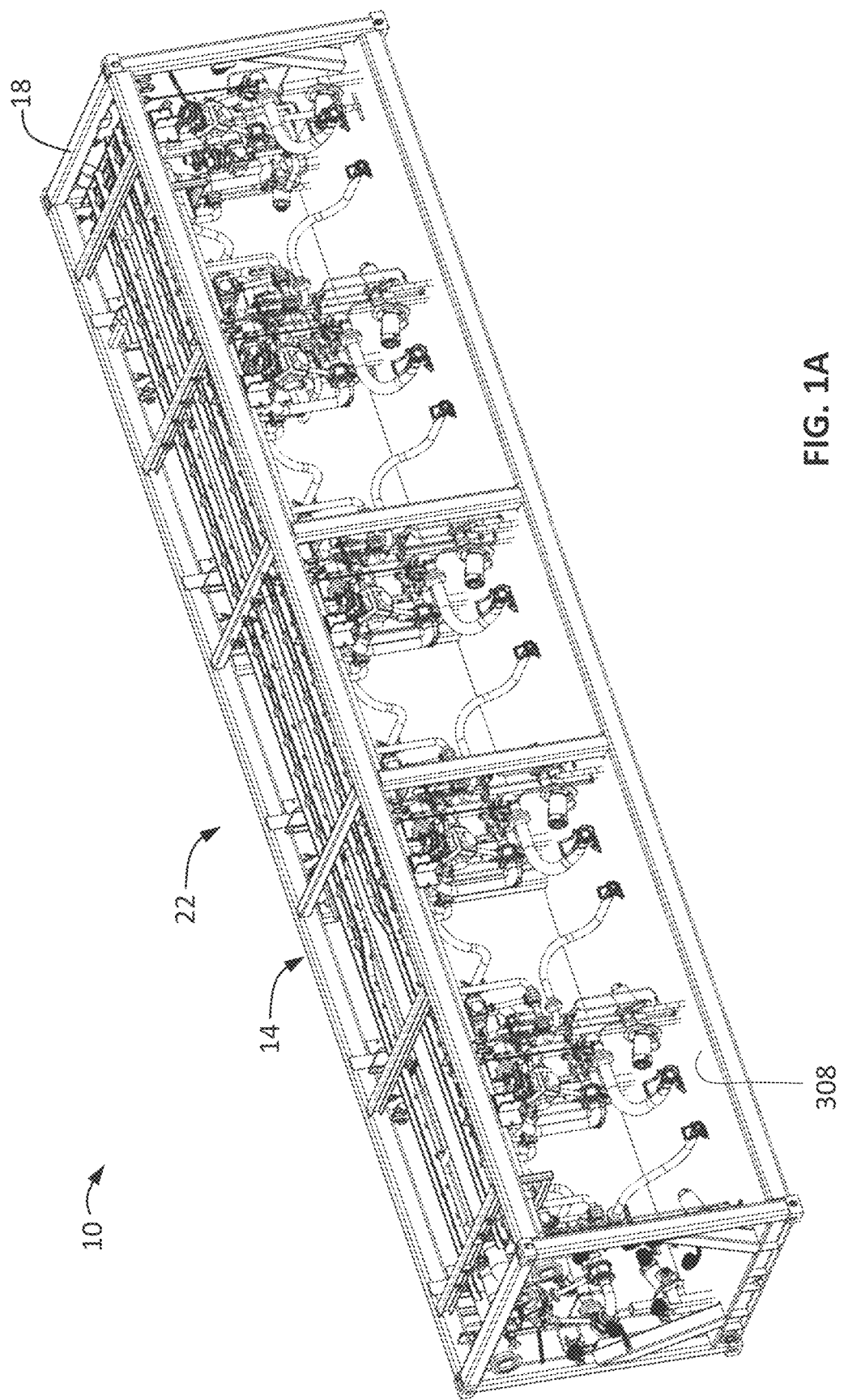
FIG. 1A depicts an upper left perspective view of an embodiment of the present modular LNG manifold apparatuses.
Figure 1B:
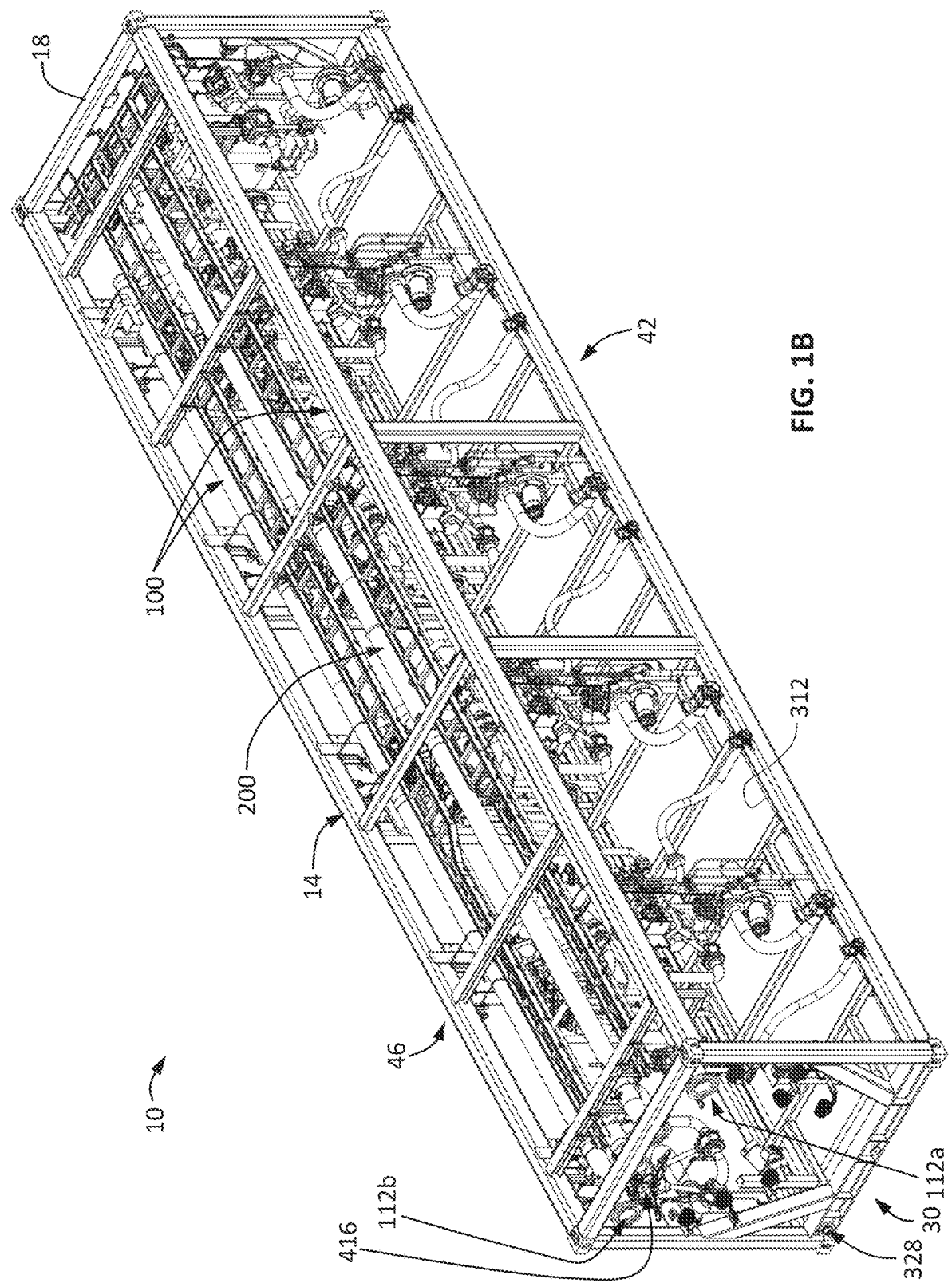
FIG. 1B depicts an upper left perspective view of the apparatus of FIG. 1A with a floor deck omitted to reveal additional features.
Figure 1C:
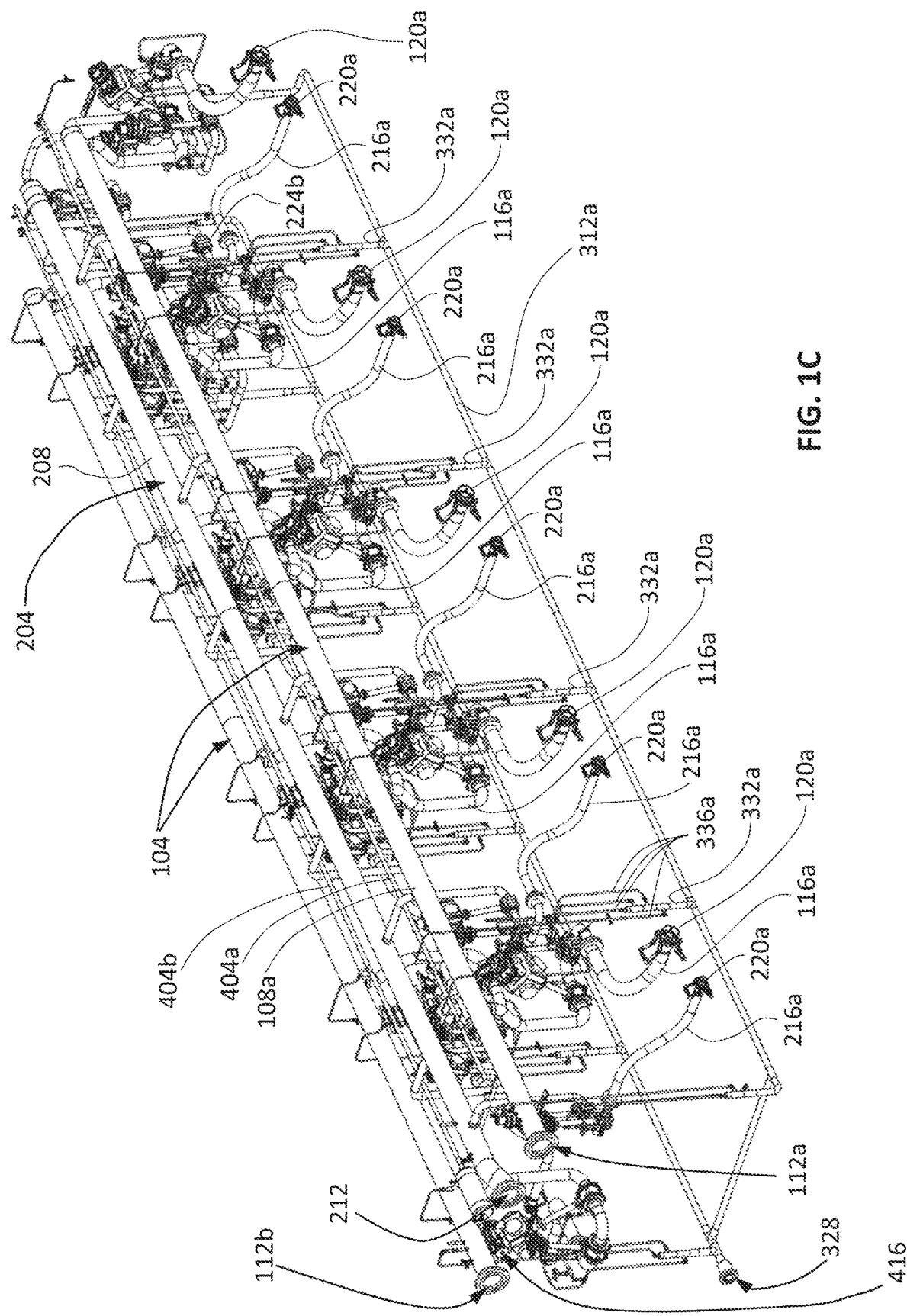
FIG. 1C depicts an upper left perspective view of certain piping systems of the apparatus of FIG. 1A.
Figure 1D:
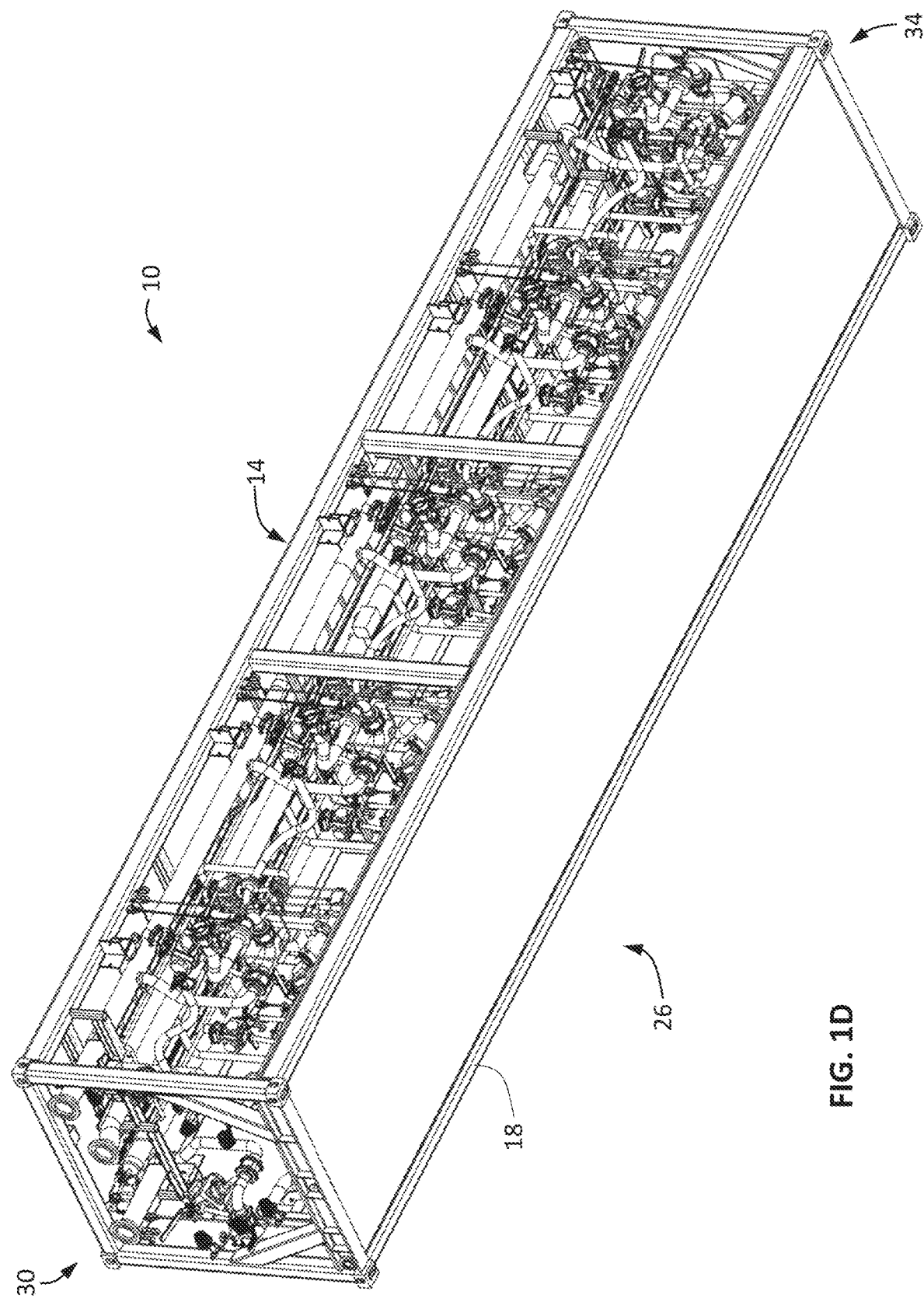
FIG. 1D depicts a lower left perspective view of the apparatus of FIG. 1A.
Figure 1E:
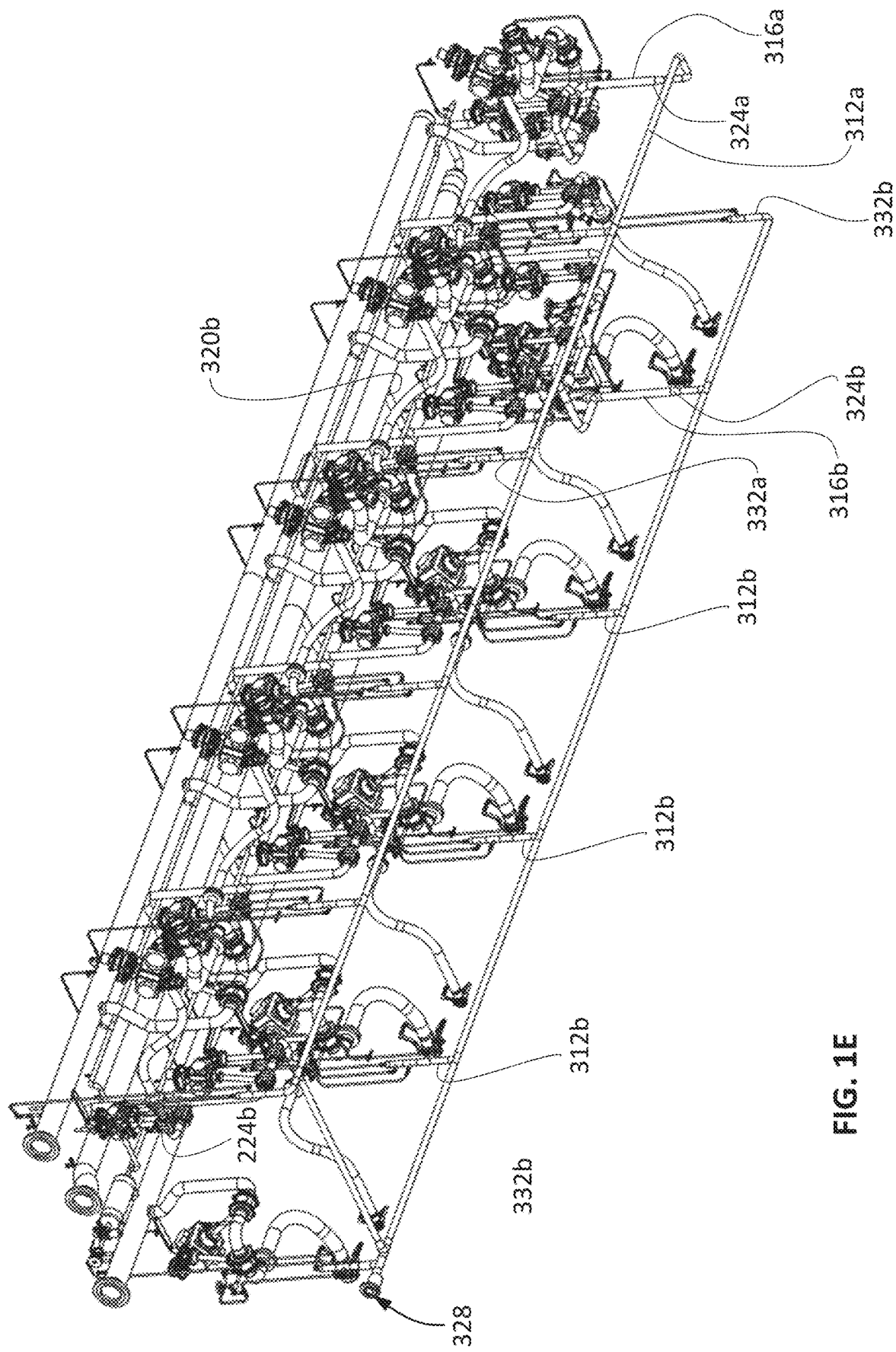
FIG. 1E depicts a lower left perspective view of certain piping systems of the apparatus of FIG. 1A.
Figure 1F:
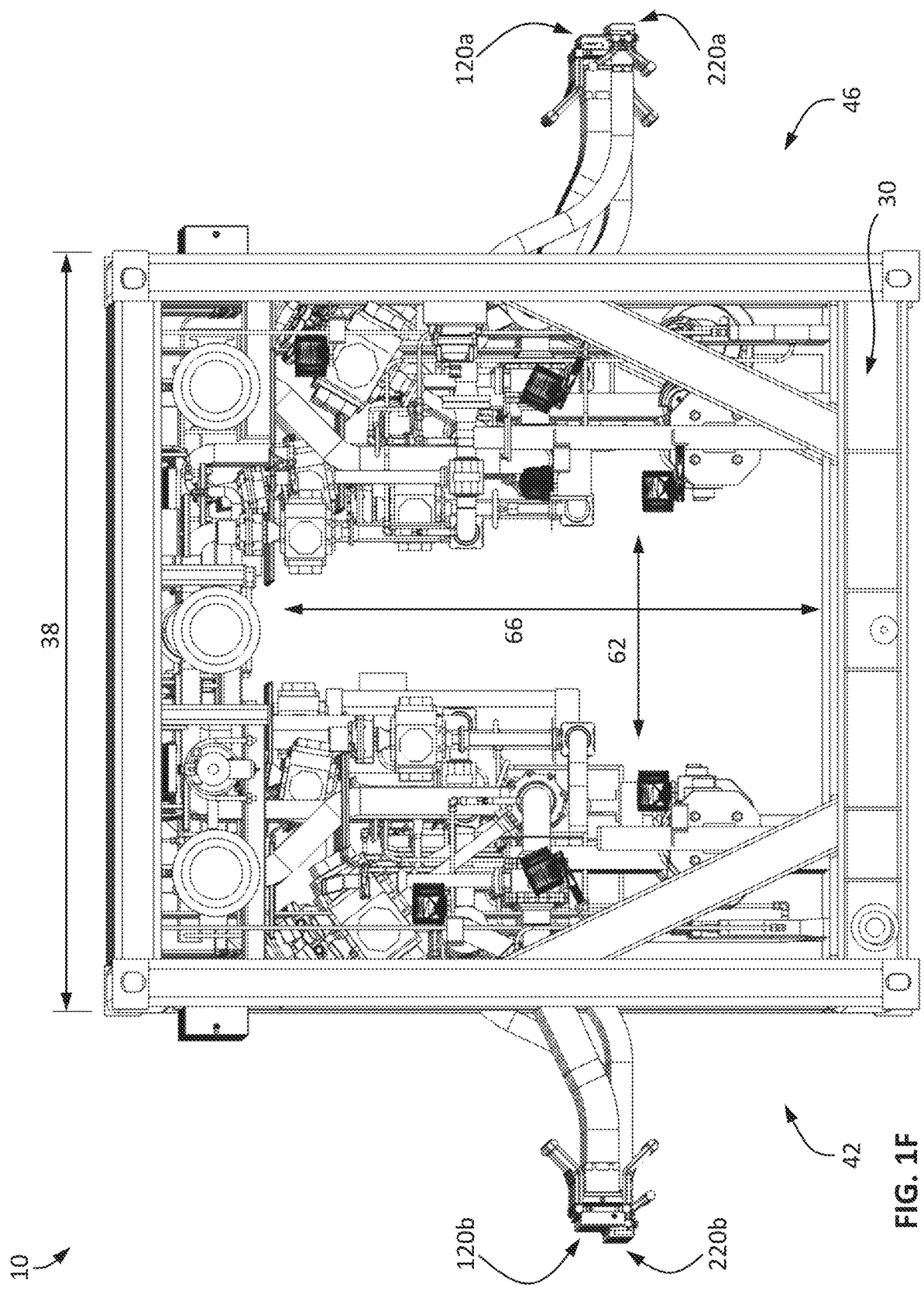
FIG. 1F depicts a left end view of the apparatus of FIG. 1A.

To allow workers to access the interior of apparatus 10, the various components are arranged to leave an open walkway along at least a majority of the length of ISO container 14. More particularly, and as shown in FIG. 1F, the components on either side of ISO container 14 are arranged such that, at each longitudinal point along a majority of the length of the TLS, the apparatus defines an open walkway having an unobstructed width 62 of at least 24 inches (e.g., at least 30 inches) measured perpendicular to each of the length and height of the ISO container, and an unobstructed height of at least 54 inches (e.g., at least 60 inches) measured perpendicular to each of the length and width of the ISO container. As can be seen in FIG. 1F, the walkway does not extend linearly along the length; rather, the walkway shifts left and right (e.g., in a serpentine-like fashion) as it proceeds along the length of the ISO container, but along its length, the walkway has the minimum unobstructed width 66 of at least 24 inches (e.g., at least 30 inches) at any given point along the length of the walkway.

As shown, apparatus 10 comprises a liquid system 100. In this embodiment, liquid system 100 comprises a first liquid header 104a supported by the ISO container. Liquid header 104a includes a first liquid trunk line 108a with a liquid trunk connection 112a and a plurality of first liquid branch lines 116a in fluid communication with the first liquid trunk line. Liquid trunk connection 112a is configured to be coupled to an external LNG source (e.g., on a seafaring LNG vessel) to deliver LNG to the liquid branch lines (or to direct LNG from the liquid branch lines to an external LNG reservoir). As also shown in more detail in FIGS. 2A-2J, each of first liquid branch lines 116a includes a liquid branch connection 120a and a liquid valve 124a configured to selectively permit or prevent fluid communication between the respective liquid branch connection 120a and liquid trunk line 108a.

In at least some embodiments, the apparatus is surface prepared and coated. Suitable coating systems including marine type coating systems, for example, including at least an epoxy anti-corrosive and a polyurethane top coat. The coating system on cryogenic piping and valves should be suitable for cryogenic temperatures.

In the embodiment shown, liquid system 100 and, specifically, liquid header 104, further includes a second liquid trunk line 108b with a second liquid trunk connection 112b and a plurality of second liquid branch lines 116b in fluid communication with the second liquid trunk line. As with first liquid trunk connection 112a, second liquid trunk connection 112b is configured to be coupled to an external LNG source (e.g., on a seafaring LNG vessel) to deliver LNG to the liquid brand lines (or to direct LNG from the liquid branch lines to an external LNG reservoir). Similar to what is shown in detail in FIGS. 2A-2J, each of second liquid branch lines 116b includes a liquid branch connection 120b and a liquid valve 124b configured to selectively permit or prevent fluid communication between the liquid branch connection 120b and second liquid trunk line 108b, such that the connections provided for each of sections or connection bays 54a-54e on second side 46 (FIG. 1I) are substantially similar to those of sections or connection bays 54a-54e on first side 42 of apparatus 10 (FIG. 1H). While not shown in FIGS. 1A-1I, in some embodiments, each liquid trunk line 108a, 108b includes a liquid emergency shutdown (ESD) valve at the respective liquid trunk connection 112a, 112b, or between the respective liquid trunk connection and the liquid branch lines 116a, 116b.

In embodiments configured to be used with LNG, the liquid lines are electrically grounded and typically configured as cryogenic lines with suitable vapor barrier and insulation and, in certain instances, additional mechanical protection surrounding the insulation. In some embodiments, the liquid lines can formed of non-corrosive materials such as stainless steel (e.g., 316L stainless steel). Liquid lines may be sized to accommodate liquid flow velocities up to seven (7) meters per second. For example, in the depicted embodiment, liquid branch lines 116a, 116b utilize at least Schedule 40 pipe and may have a nominal diameter of three (3) inches. The portion of each liquid branch line 116a, 116b adjacent the respective liquid branch connection 120a, 120b can be formed of a length of flexible, cryogenic-service stainless steel braided hose, and the respective liquid branch connections can comprise quick connectors (e.g., dry break quick connectors).

As shown, apparatus 10 also comprises a vent system 200. In this embodiment, vent system 200 comprises a safety vent header 204 supported by the ISO container. Safety vent header 204 includes a vent trunk line 208 with a vent trunk connection 212 and a plurality of first vent branch lines 216a in fluid communication with the vent trunk line. Vent trunk connection 212 is configured to be coupled to an external vent line to deliver vapor from the vent branch lines to the external vent line. As also shown in more detail in FIGS. 2A-2J, each of first vent branch lines 216a includes a vent branch connection 220a and a vent valve 224a configured to selectively permit or prevent fluid communication between the respective vent branch connection 220a and vent trunk line 208.

In the embodiment shown, vent system 200 and, specifically, vent header 204, further includes a plurality of second vent branch lines 216b in fluid communication with vent trunk line 208. As with first vent branch lines 216a, vent trunk line 208 is configured to deliver vapor from second vent branch lines 216b to the external vent line via vent connection 212. Similar to what is shown in detail in FIGS. 2A-2J, each of second vent branch line 216b includes a liquid branch connection 220b and a liquid valve 224b configured to selectively permit or prevent fluid communication between the liquid branch connection 220b and liquid trunk line 208, such that the connections provided for each of sections or connection bays 54a-54e on second side 46 (FIG. 1I) are substantially similar to those of sections or connection bays 54a-54e on first side 42 of apparatus 10 (FIG. 1H).

In embodiments configured to be used with LNG, the vent lines are electrically grounded and typically configured as cryogenic lines with suitable vapor barrier and insulation and, in certain instances, additional mechanical protection surrounding the insulation. In some embodiments, the vent lines can formed of non-corrosive materials such as stainless steel (e.g., 316L stainless steel). Vent lines may be sized to accommodate liquid flow velocities up to thirty (30) meters per second. For example, in the depicted embodiment, vent branch lines 216a, 216b utilize at least Schedule 40 pipe and may have a nominal diameter of two (2) inches. The portion of each vent branch line 216a, 216b adjacent the respective vent branch connection 220a, 220b can be formed of a length of flexible, cryogenic-service stainless steel braided hose, and the respective liquid branch connections can comprise quick connectors (e.g., dry break quick connectors).

As shown, apparatus 10 also comprises a drain system 300. In this embodiment, drain system 300 comprises a drain header 304 supported by the ISO container, for example, beneath a floor 308 of ISO container 14. Drain header 304 includes a drain trunk line 312a and a drain branch line 316a, with a first end 320a of drain branch line 316a being in fluid communication with vent trunk line 208 (FIGS. 3B-3H), and a second end 324a of drain branch line 316a being in fluid communication with drain trunk line 312a. In the depicted configuration, drain trunk line 312a extends along a majority of the length of the ISO container and includes a drain trunk connection 328 that is configured to be coupled to an external drain line. Drain system 300 also includes a plurality of (six) drain branch inlets 332a extending from drain trunk line 312a to receive drainage from various pressure relief valves on the liquid branch lines (116a) and vent branch lines (216a) via corresponding tertiary drain lines 336a. As also shown in more detail in FIGS. 3A-3H, drain branch line 316a includes a first drain valve 340 and a second drain valve 344, with both of first and second valves 340, 344 disposed between first and second ends 320a, 324a such that either or both of valves 340, 344 can be closed to prevent fluid communication between drain trunk line 312a and vent trunk line 208. Drain system 300 also includes a liquid-drain line 348 having a first end 352 in fluid communication with one of the plurality of liquid branch lines 116, and a second end 356 in fluid communication with drain branch line 316a at a point 360a between first and second drain valves 340, 344. Drain branch line 316a, and the corresponding liquid-drain line 348 and valves 340, 344, comprise parts of a crossover system described in more detail below with reference to FIGS. 3A-3H.

In the embodiment shown, drain system 300 and, specifically, drain header 304, further includes a second drain trunk line 312b in fluid communication with first drain trunk line 312a such that second drain trunk line 312b is also in fluid communication with liquid trunk connection 312. In other embodiments, the second drain trunk line can include a second liquid trunk connection and not be in fluid communication with the first drain trunk line. Similar to first liquid trunk line 312a, second liquid trunk line 312b includes a second liquid branch line 316b, with a first end 320b of second drain branch line 316b being in fluid communication with vent trunk line 208 (FIGS. 3B-3H), and a second end 324b of drain branch line 316b being in fluid communication with drain trunk line 312b. In the depicted configuration, second drain trunk line 312b also extends along a majority of the length of the ISO container. Drain system 300 also includes a plurality of (six) drain branch inlets 332b extending from drain trunk line 312b to receive drainage from various pressure relief valves on the liquid branch lines (116b) and vent branch lines (216b) via corresponding tertiary drain lines 336b. Similar to what is shown in detail in FIGS. 3A-3H, second drain branch line 316b includes a first drain valve 340 and a second drain valve 344, with both of first and second valves 340, 344 disposed between first and second ends 320b, 324b such that either or both of valves 340, 344 can be closed to prevent fluid communication between second drain trunk line 312b and vent trunk line 208. Drain system 300 also includes a second liquid-drain line 348 having a first end 352 in fluid communication with the adjacent liquid branch line 116b, and a second end 356b in fluid communication with second drain branch line 316b at a point between the corresponding first and second drain valves in second drain branch line 316b. Drain branch line 316b, and the corresponding liquid-drain line 348 and valves 340, 344, comprise parts of a second crossover system similar to the one described in more detail below with reference to FIGS. 3A-3H.

In the depicted embodiment, floor 308 of ISO container 14 comprises a drain pan below drain trunk lines 312a, 312b to catch any spills or leaks that escape or are not routed into the drain trunk lines. To help ensure that any such spills or leaks are directed to the drain pan, floor 208 comprises a metal grate through which liquid can pass into the drain pan.

In the embodiment shown, apparatus 10 further comprises a pneumatic system 400 that includes a pneumatic header 404 supported by the ISO container. Pneumatic header 404 includes a pneumatic trunk line 408a and a plurality of pneumatic branch lines 412a configured to deliver pressurized pneumatic fluid to various points throughout the apparatus 10, such as, for example, for service "air" and/or for various valves and sensors on first side 42 of ISO container 14. As one example, ISO tank containers for LNG typically include an emergency shutdown (ESD) valve coupled to the liquid connection of the tank, and such a liquid ESD valve can be configured as a pneumatic valve that (a) includes an inlet that is coupled to one of the pneumatic branch lines; (b) is biased to remain closed in the absence of pneumatic fluid at the inlet being pressurized to a level that exceeds a threshold; and (c) is configured to, upon pressurization of pneumatic fluid at the inlet to a level that exceeds the threshold, shift to an open state in which the valve does not block fluid communication with the liquid trunk line. As another example, ISO tank containers for LNG typically include an emergency shutdown (ESD) valve coupled to the vent connection of the tank, and such a vent ESD valve can be configured as a pneumatic valve that (a) includes an inlet that is coupled to one of the pneumatic branch lines; (b) is biased to remain closed in the absence of pneumatic fluid at the inlet being pressurized to a level that exceeds a threshold; and (c) is configured to, upon pressurization of pneumatic fluid at the inlet to a level that exceeds the threshold, shift to an open state in which the valve does not block fluid communication with the liquid trunk line. In the depicted configuration, pneumatic trunk line 408a extends a majority of the length of ISO container 14 and includes a pneumatic trunk connection 416 that is configured to be coupled to an external source of pressurized pneumatic fluid for distribution to pneumatic branch lines 412a. Pneumatic system 400 can be configured to utilize any of various types of inert fluids, such as, for example, air, nitrogen, or other suitable pneumatic fluid.

In the embodiment shown, pneumatic system 400 and, specifically, pneumatic header 404, further includes a second pneumatic trunk line 408b in fluid communication with first pneumatic trunk line 408a such that second pneumatic trunk line 408b is also in fluid communication with pneumatic trunk connection 416. In other embodiments, the second pneumatic trunk line can include a second pneumatic trunk connection and not be in fluid communication with the first pneumatic trunk line. Similar to first pneumatic trunk line 408a, second pneumatic trunk line 408b includes a plurality of second pneumatic branch lines 412b configured to deliver pressurized pneumatic fluid to various points throughout the apparatus 10, such as, for example, for service "air" and/or for various valves and sensors on second side 46 of ISO container 14. In the depicted configuration, second pneumatic trunk line 408b also extends along a majority of the length of the ISO container.

As shown, apparatus 10 also comprises a drain system 300. In this embodiment, drain system 300 comprises a drain header 304 supported by the ISO container, for example, beneath a floor 308 of ISO container 14. Drain header 304 includes a drain trunk line 312a and a drain branch line 316a, with a first end 320a of drain branch line 316a being in fluid communication with vent trunk line 208 (FIGS. 3B-3H), and a second end 324a of drain branch line 316a being in fluid communication with drain trunk line 312a. In the depicted configuration, drain trunk line 312a extends along a majority of the length of the ISO container and includes a drain trunk connection 328 that is configured to be coupled to an external drain line. Drain system 300 also includes a plurality of (six) drain branch inlets 332a extending from drain trunk line 312a to receive drainage from various pressure relief valves on the liquid branch lines (116a) and vent branch lines (216a) via corresponding tertiary drain lines 336a. As also shown in more detail in FIGS. 3A-3H, drain branch line 316a includes a first drain valve 340 and a second drain valve 344, with both of first and second valves 340, 344 disposed between first and second ends 320a, 324a such that either or both of valves 340, 344 can be closed to prevent fluid communication between drain trunk line 312a and vent trunk line 208. Drain system 300 also includes a liquid-drain line 348 having a first end 352 in fluid communication with one of the plurality of liquid branch lines 116, and a second end 356 in fluid communication with drain branch line 316a at a point 360a between first and second drain valves 340, 344. Drain branch line 316a, and the corresponding liquid-drain line 348 and valves 340, 344, comprise parts of a crossover system described in more detail below with reference to FIGS. 3A-3H.

In some embodiments, apparatus 10 further comprises a nitrogen system for "interting"—i.e., displacing any non-inert gases from, by filling with inert nitrogen—at least the liquid system (e.g., and the vent and/or drain systems) prior to delivering LNG to apparatus 10. Such a nitrogen system can comprise a nitrogen header supported by the ISO container. The nitrogen header can include one or two nitrogen header(s) each including a nitrogen trunk line with a nitrogen connection and a plurality of nitrogen branch lines. The nitrogen branch lines each has a first end in fluid communication with the corresponding nitrogen trunk line and a second end coupled to a nitrogen valve in fluid communication with a liquid branch line and/or a vent branch line such that each nitrogen valve can be opened to permit the flow of nitrogen to the respective branch line(s) or closed to prevent the flow of nitrogen to the respective branch line(s).

In any of the present embodiments, the modular manifold apparatuses can further include a water spray header (e.g., of 90-10 Cu—Ni alloy) with spray nozzles spaced along the length of the ISO container (e.g., 14) to provide flow (e.g., according to IGC standards) on the vertical face of each ISO tank container valve arrangement. In such embodiments, the water spray header can include a connection on at least one end of the header to connect to a water supply line of a marine vessel on which the apparatus is disposed.

In any of the present embodiments, the modular manifold apparatuses can further include a fire-suppression header header (e.g., of 316L stainless steel) with outlet nozzles spaced along the length of the container (e.g., 14) to spray dry chemical (powder) onto each ISO tank container. In such embodiments, the fire-suppression header can include a connection on at least one end of the header to connect to a dry powder supply line of a marine vessel on which the apparatus is disposed. Such a fire-suppression header enables the application of dry chemical to extinguish fire without the need for personnel to be present.

In any of the present embodiments, the modular manifold apparatuses can further include:
- gas detectors, for example, connected to the vessel control system via the control panel (e.g., 70) of the apparatus;
- fire detectors, for example, connected to the vessel control system via the control panel (e.g., 70) of the apparatus;
- an amber (alarm) beacon, red (ESD) beacon, blue (gas detected) beacon, and/or an audible siren;
- a general alarm siren (e.g., located at a midpoint of the container (e.g., 14)) and cabled to the control panel (e.g, 70) of the apparatus;
- explosion resistant LED lighting spaced along the length of the container (e.g., 14) to facilitate nighttime operations, for example providing illumination levels of 50 lux or more;
- a VHF booster to ensure reliable VHF radio communication for all points; and/or
- one or more CCTV cameras, for example, connected to the vessel control system via the control panel (e.g., 70) of the apparatus.

Apparatus 10 includes respective liquid and vent connections for each section or connection bay 54a, 54b, 54c, 54d, 54e. Stated another way, and as illustrated in FIG. 1H, for each nominal 8 feet of length 50, first side 42 is configured to permit access to the liquid branch connection (120a) of one of the first liquid lines and the vent branch connection (220a) of one of the first vent lines. In the embodiment shown, and as illustrated in FIG. 1I, for each nominal 8 feet of length 50, second side 46 is also configured to permit access to the liquid branch connection of one of first liquid lines and the vent branch connection of one of the first vent lines. In other embodiments, apparatus 10 includes connections for ISO tank containers on only first side 42 of the ISO container 14, such that second liquid branch lines 116b (and second liquid header 108b) and second vent branch lines 216b are omitted.

FIGS. 2A-2J depict enlarged views of a single exemplary tank connection bay (54c), each of which, in the depicted embodiment, includes the connections described here. In FIGS. 2A-2J, apparatus 14 is sectioned lengthwise (halfway between side 42 and side 46) to improve the clarity with which the connections on first side 42 can be seen. As shown, liquid valve 124a is a manual valve, and each liquid branch line 116a further includes a second liquid valve 128a that is disposed between the corresponding first liquid valve 124a and liquid trunk line 108a. In this embodiment, second liquid valve 128a is an electric valve that is controllable via electric signals (e.g., to open or close the valve) and is configured to be throttled such that the valve can be partially opened or closed incrementally, as opposed to only fully open or fully closed. In other embodiments, the second liquid valve can be configured to be controlled via pneumatic pressure. For example, the second liquid valve can be configured as a pneumatic emergency shut down (ESD) valve that is biased to remain closed in the absence of an electronic control signal or sufficient pneumatic pressure).

As also shown, vent valve 224a is a manual valve, and each vent branch line 216 further includes a second vent valve 228a that is disposed between the corresponding first vent valve 224a and vent trunk line 208. In this embodiment, second liquid valve 128a is an electric valve that is controllable via electric signals to be opened or closed. In other embodiments, the second liquid valve can be configured to be throttled such that the valve can be partially opened or closed incrementally, as opposed to only fully open or fully closed, and/or can be configured to be controlled via pneumatic pressure. For example, the second vent valve can be configured as a pneumatic emergency shut down (ESD) valve that is biased to remain closed in the absence of an electronic control signal or sufficient pneumatic pressure).

FIGS. 3A-3H depict one example of a crossover system 500 of apparatus 10 that is disposed at the fifth tank connection bay (54e) on first side 42 of ISO container 14. As shown, crossover system 500 comprises a first crossover line 504, defined by first drain branch line 316a, having a first end 320a in fluid communication with vent trunk line 208 and a second end 324a in fluid communication with drain trunk line 312a. Crossover system 500 also comprises a second crossover line 508 having a first end 512 in fluid communication with first liquid trunk line 108a and a second end 516 in fluid communication with first crossover line 504 at a first point 520 between the first and second ends of the first crossover line. As shown, second crossover line 508 is defined by liquid-drain line 348 and an upper segment 524 of the liquid branch line (116a) of the fifth tank connection bay (54e) on first side 46 of ISO container 14. As shown, crossover system 500 further comprises a first crossover valve 528 disposed between vent trunk line 208 and first point 520, with the first crossover valve being configured to permit or prevent flow through crossover line 504 between the vent trunk line and the first point; and a second crossover valve 532 disposed between first point 520 and drain trunk line 312a, with the second crossover valve being configured to permit or prevent flow through the crossover line between the first point and the drain trunk line. In this embodiment, first and second crossover valves 528, 532 are electric valves that are controllable via electric signals to be opened or closed. In other embodiments, the first and second crossover valves can be configured to be controlled via pneumatic pressure. For example, the first and second crossover valves can be configured as a pneumatic valves that are biased to remain closed in the absence of an electronic control signal or sufficient pneumatic pressure.

As configured, crossover system 500 is configured to permit both of first and second crossover valves 528, 532 to be opened to circulate fluid simultaneously through the liquid trunk line and the vent trunk line. For example, during cooling of the liquid and vent systems prior to filling ISO tank containers connected to apparatus 10, first crossover valve 528 can be opened, and second crossover valve 532 closed, such that LNG delivered to liquid trunk line 108a will flow through the upper portion of the first crossover line (504), through the second crossover line (508), and into vent trunk line 208 to cool the liquid trunk line and the vent trunk line (e.g., and the respective liquid and vent branch lines). Additionally, second crossover valve 532 can be opened to direct residual liquid in vent trunk line 208 (and, if first crossover valve 528 is also open, to also direct residual liquid in liquid trunk line 108a) to flow to drain trunk line 316a through the lower portion of drain branch line 316a. During filling of ISO tank containers connected to apparatus 10, first and second crossover valves 528, 532 are typically closed to prevent communication between liquid trunk line 108a and vent trunk line 208, and between drain trunk line 312a and both of liquid and vent trunk lines 108a, 208, such that substantially all liquid flowing into liquid trunk line 108a through liquid trunk connection 112a is directed to the corresponding liquid branch lines 116a (e.g., and into connected ISO tank containers).

As shown, crossover system 500 further comprises a bypass line 536 with its ends in communication with first crossover line 504 (drain branch line 316a) on either side of second crossover valve 532. As shown, bypass line 536 includes a bypass valve 540 that is normally closed but can be opened to bypass second crossover valve 532, such as if second crossover valve 532 malfunctions, or if apparatus 10 is not connected to a source of power or pneumatic fluid, such that second crossover valve 532 cannot be opened. In this embodiment, crossover system 500 also comprises a third crossover valve 548 between first point 520 and the closest end of bypass line 536. Third crossover valve 548 is normally open but can be closed to prevent flow between first point 520 and drain trunk line 312a.

Apparatus 10 also includes a second crossover system between second liquid trunk line 108b, vent header 208, and second drain trunk line 312b on second side 46 of ISO container, which second crossover system is substantially similar to crossover system 500 with the exception that the second crossover system is disposed at the fourth tank connection bay (54d) of second side 46 rather than the fifth tank connection bay. Other embodiments in which liquid system 100 includes only a single liquid trunk line, may include only a single crossover system. Other embodiments omit a crossover system, such that the liquid and trunk systems are independently pre-cooled.

While illustrated with ductile and/or substantially rigid piping, temperature changes of the liquid and vent systems (e.g., during pre-cooling and/or after filling ISO tank containers) can cause differential expansion between different components of crossover system 500, liquid system 100, and vent system 200. If not managed by controlled filling/emptying of the lines, expansion and contraction can introduce stresses and ultimately lead to mechanical fatigue and failure. To mitigate such stresses, other embodiments can include flexible portions within certain lines to mechanically decouple the liquid and vent systems from each other and from the drain system. For example, in some embodiments, each of an upper segment 552 of first crossover line 504, and a lower segment 556 of drain branch line 316*a*, can utilize a flexible section defined by a flexible conduit (e.g., connected to the rest of the piping via flanged connections, slip joints, or the like). Similarly, liquid trunk lines 108*a*, 108*b* and vent trunk line 208 can each include one or more flexible segments defined by a flexible conduit (e.g., connected to the rest of the piping via flanged connections, slip joints, or the like) to reduce differential expansion/contraction, and resulting stresses, along the relatively long lengths of these trunk lines. For example, in some embodiments, each liquid trunk line 108*a*, 108*b* includes three segments of ductile and/or substantially rigid pipe joined by two flexible segments of flexible pipe or conduit, and/or vent trunk line 208 includes two segments of ductile and/or substantially rigid pipe joined by one flexible segment of flexible pipe or conduit.

Figure 1G:
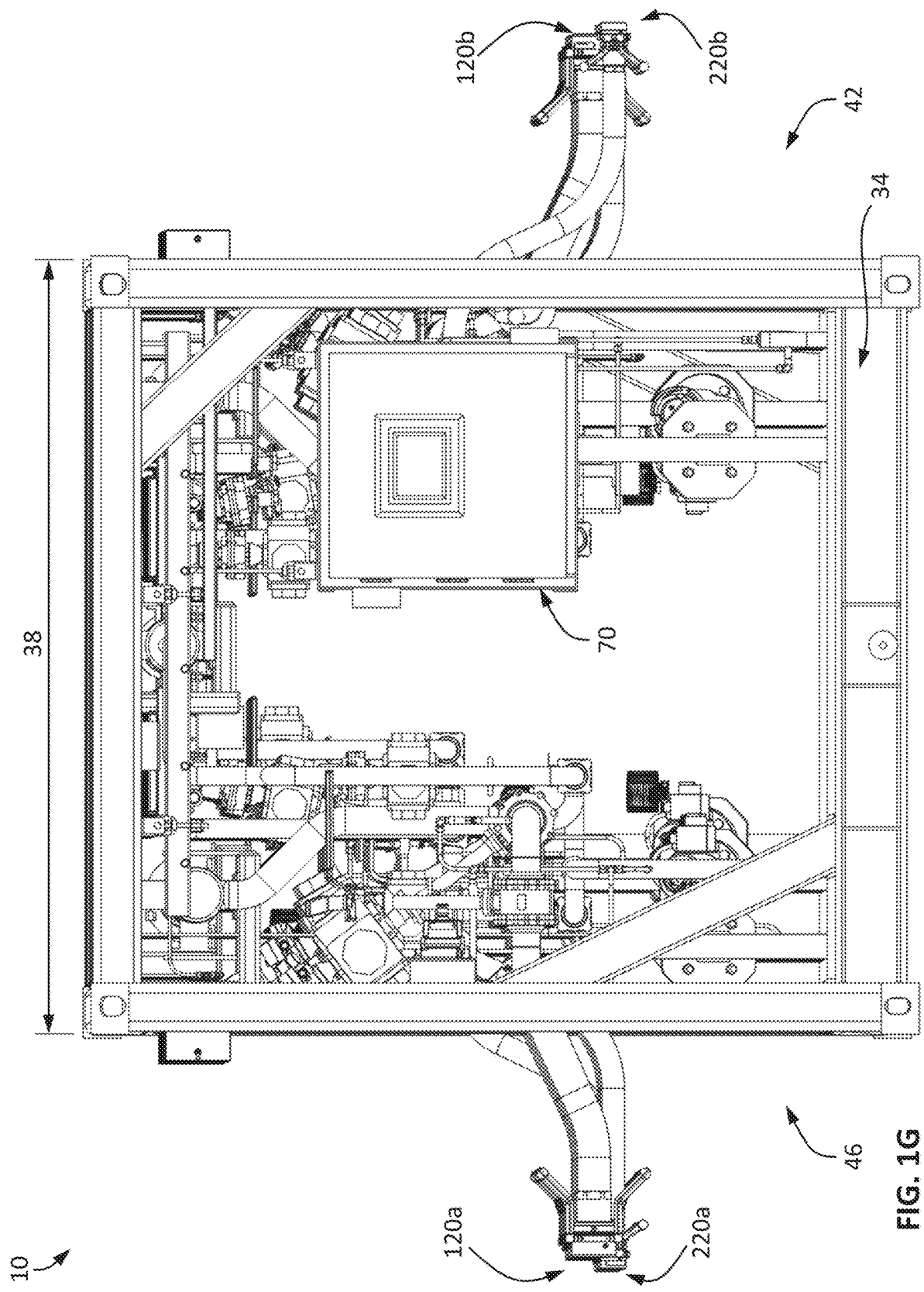
FIG. 1G depicts a right end view of the apparatus of FIG. 1A.
Figure 2A:
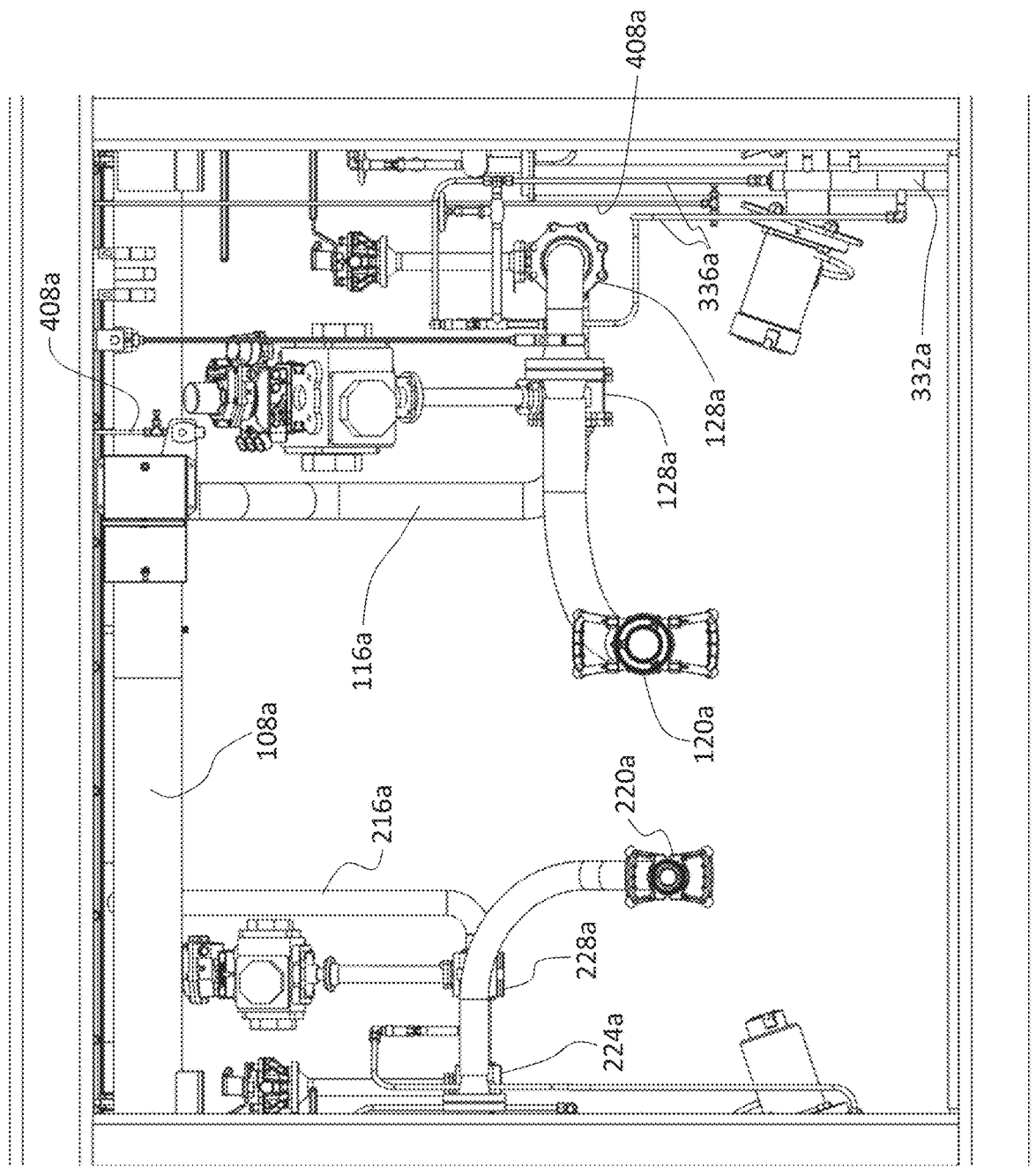
FIG. 2A depicts a cutaway first side view of a tank connection bay of the apparatus of FIG. 1A.
Figure 2B:
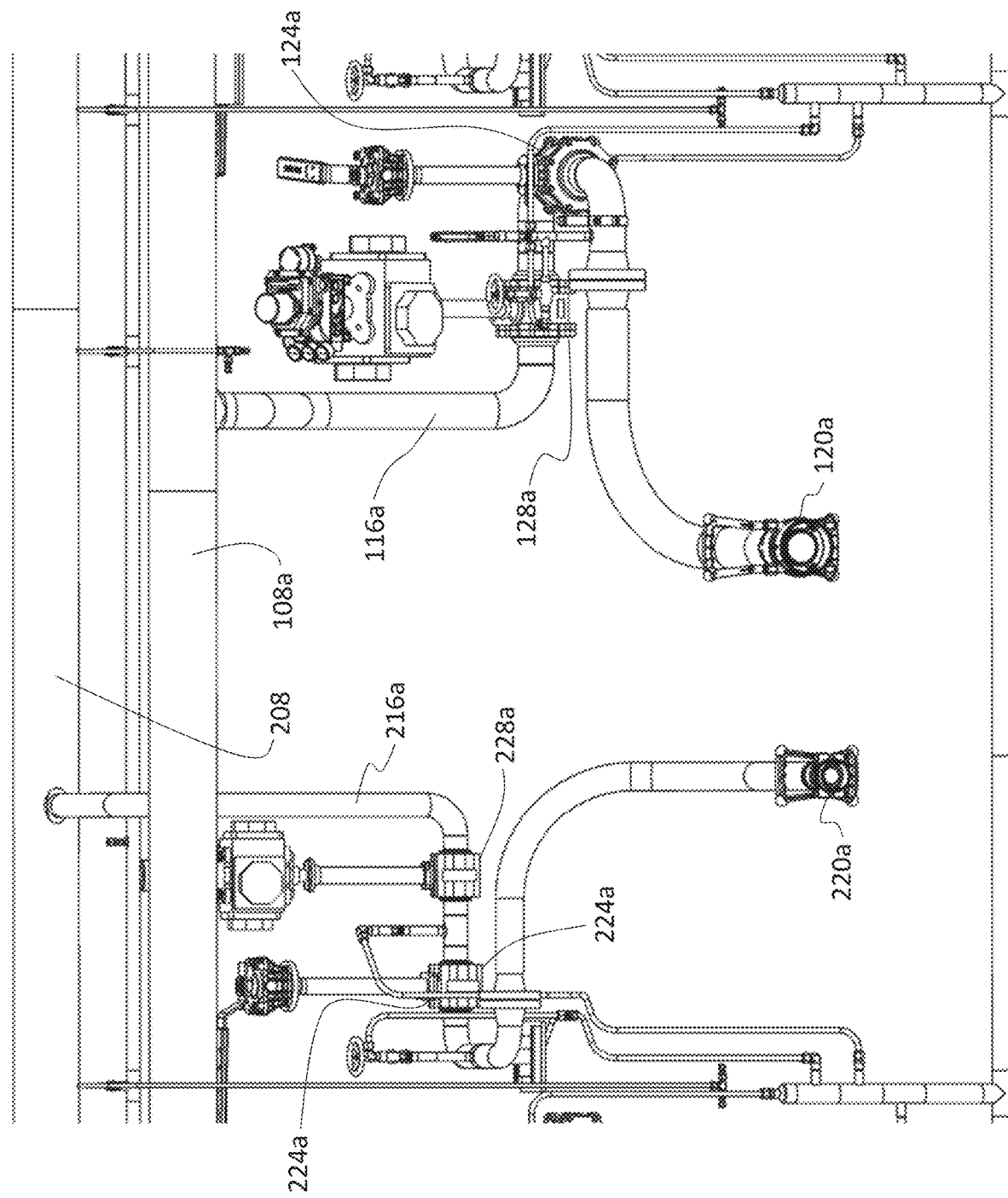
FIG. 2B depicts cutaway first side view of certain piping systems of the connection bay of FIG. 2A.
Figure 2D:
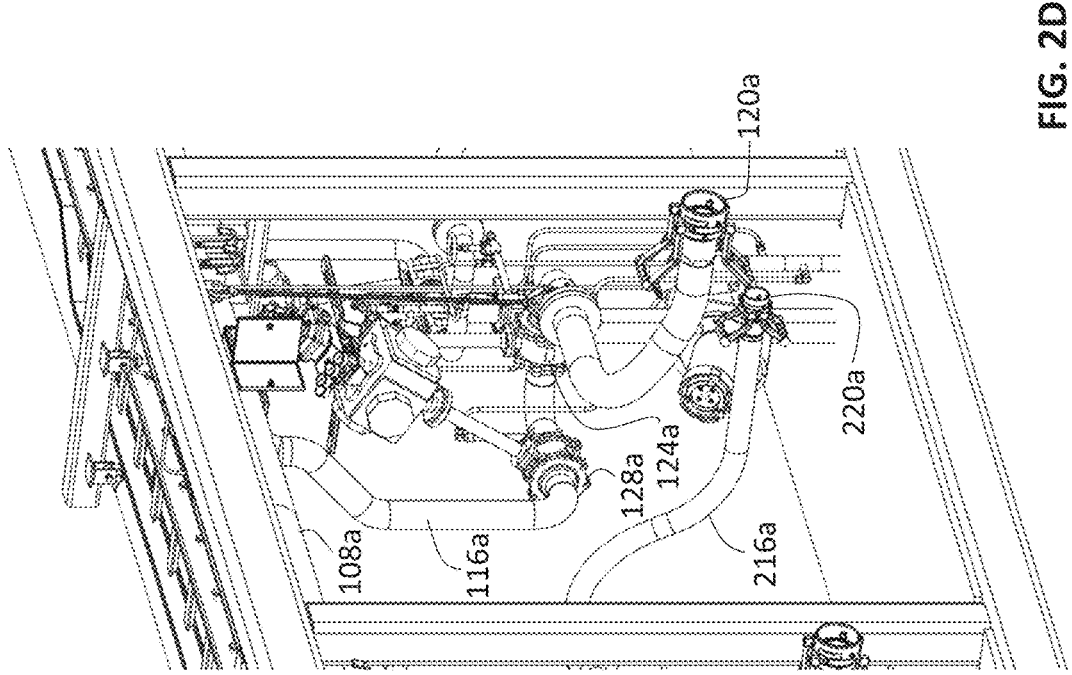
FIG. 2D depicts an upper left perspective view of the connection bay of FIG. 2A.
Figure 2C:
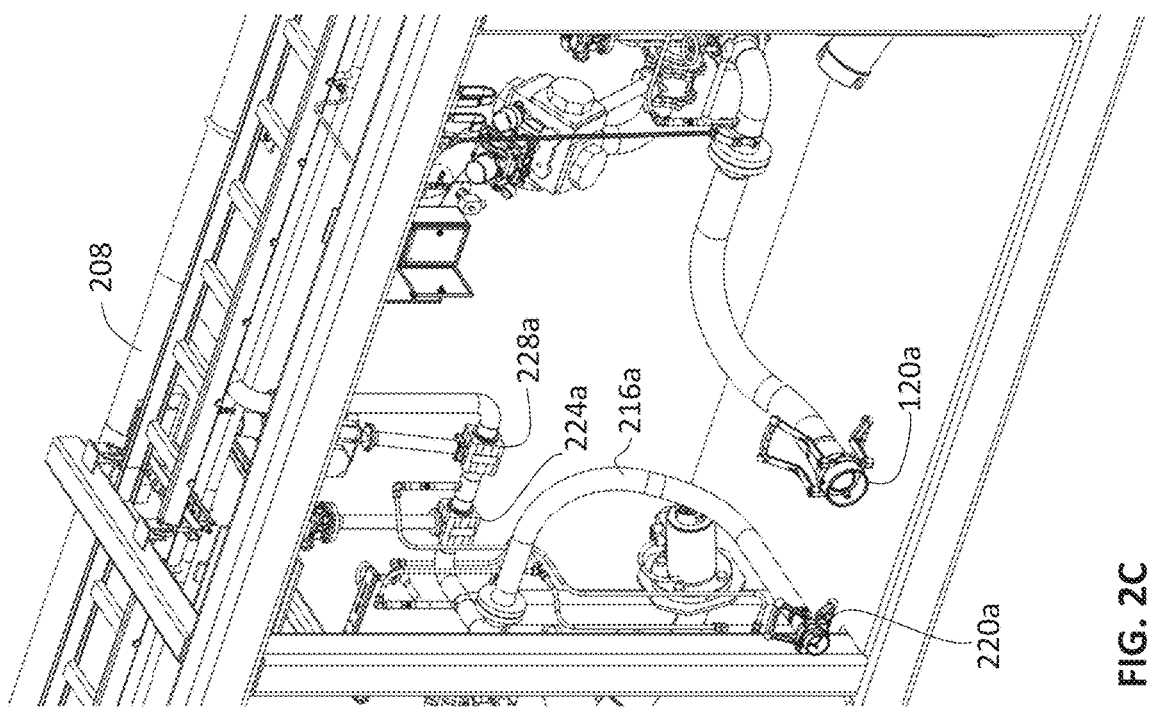
FIG. 2C depicts an upper right perspective view of the connection bay of FIG. 2A.
Figure 2F:
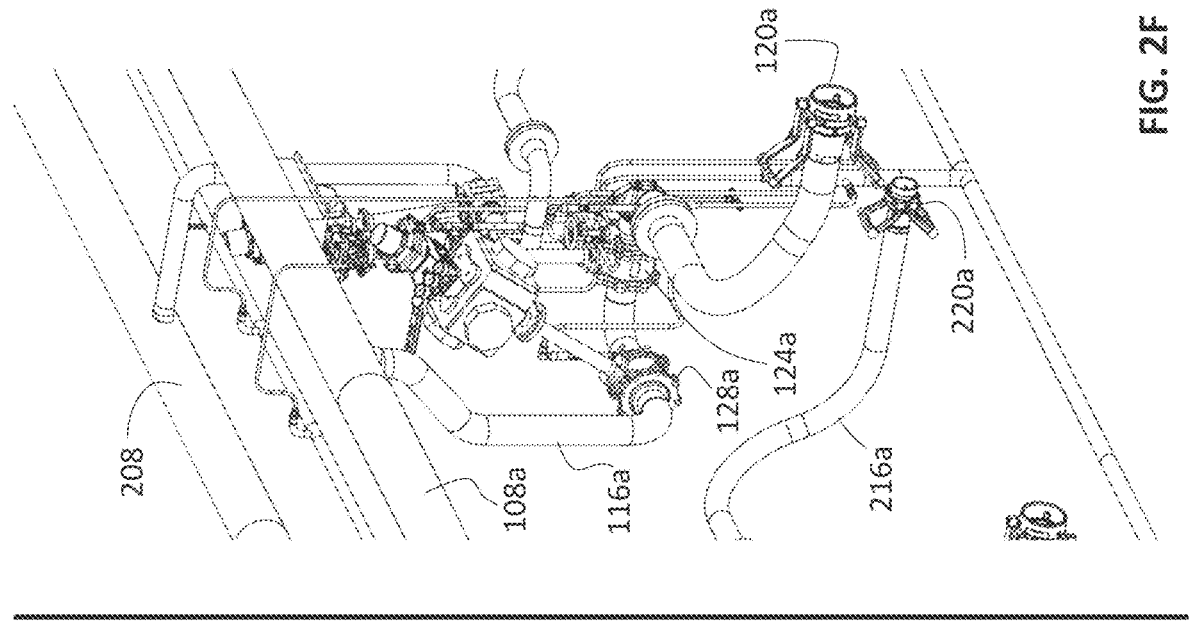
FIG. 2F depicts an upper left perspective view of a portion of the piping systems of FIG. 2B.
Figure 2E:
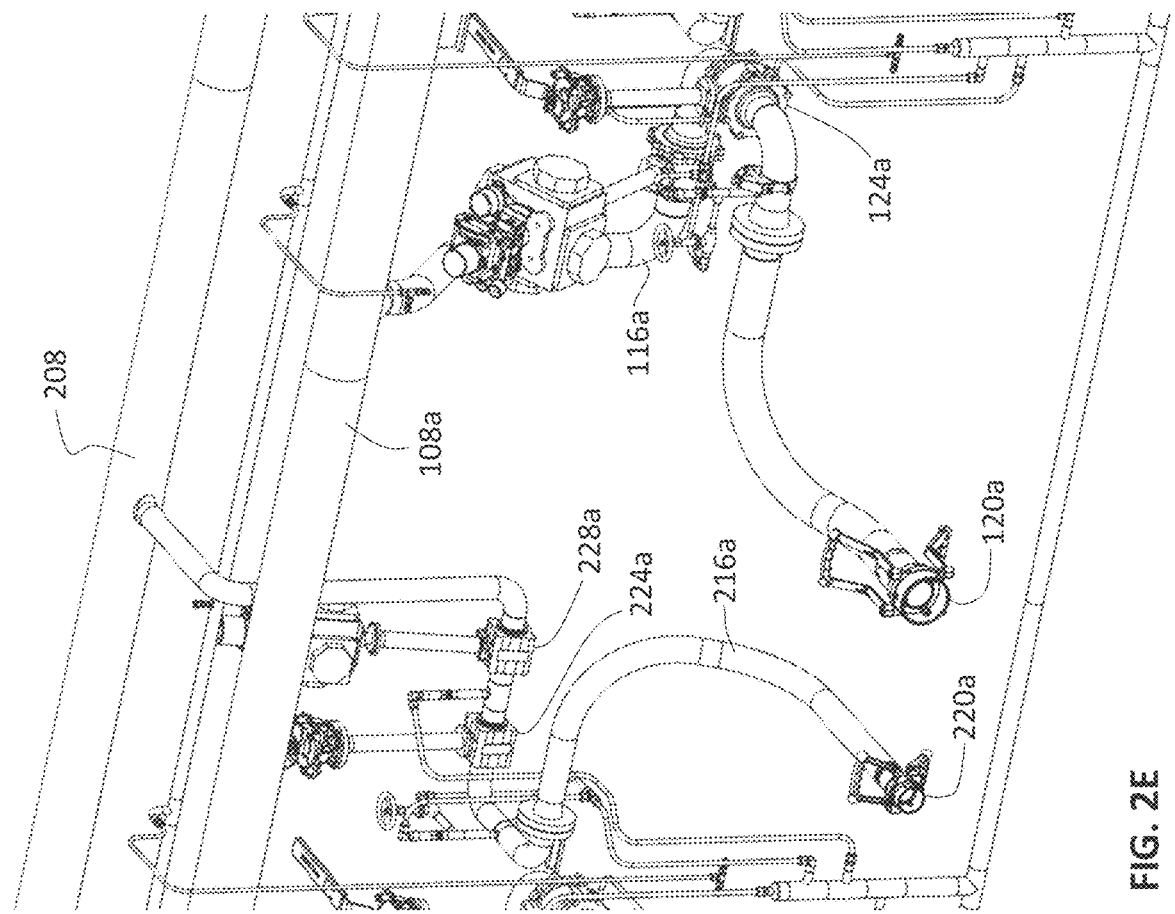
FIG. 2E depicts an upper right perspective view of the piping systems of FIG. 2B.
Figure 2H:
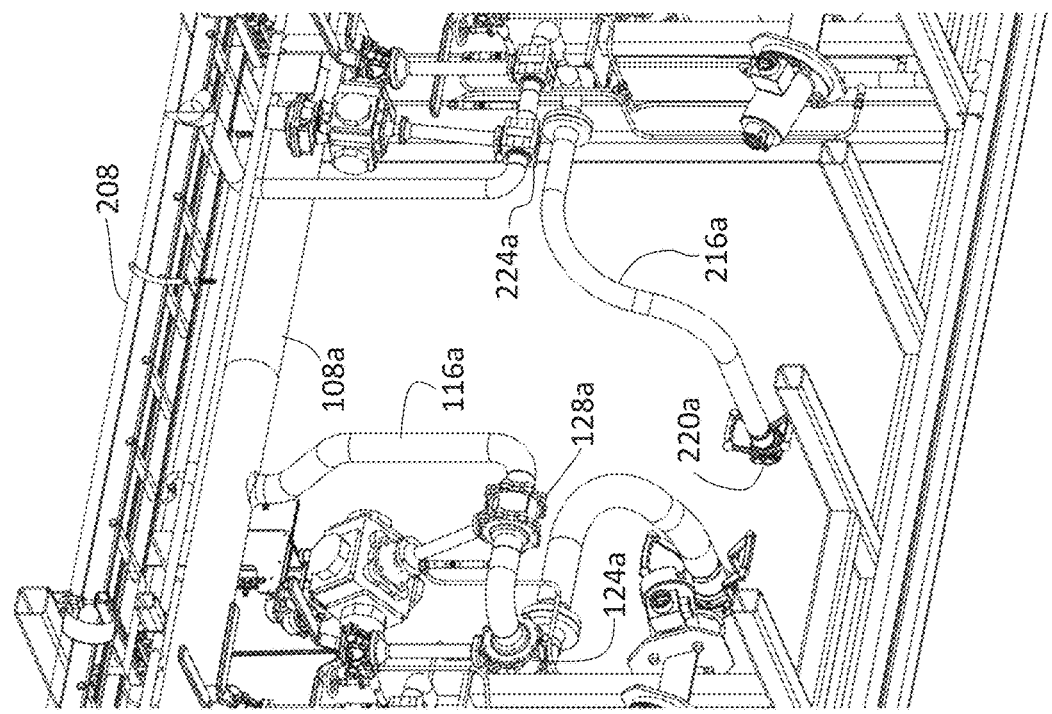
FIG. 2H depicts a cutaway, lower left perspective view of the rear of the connection bay of FIG. 2A.
Figure 2G:
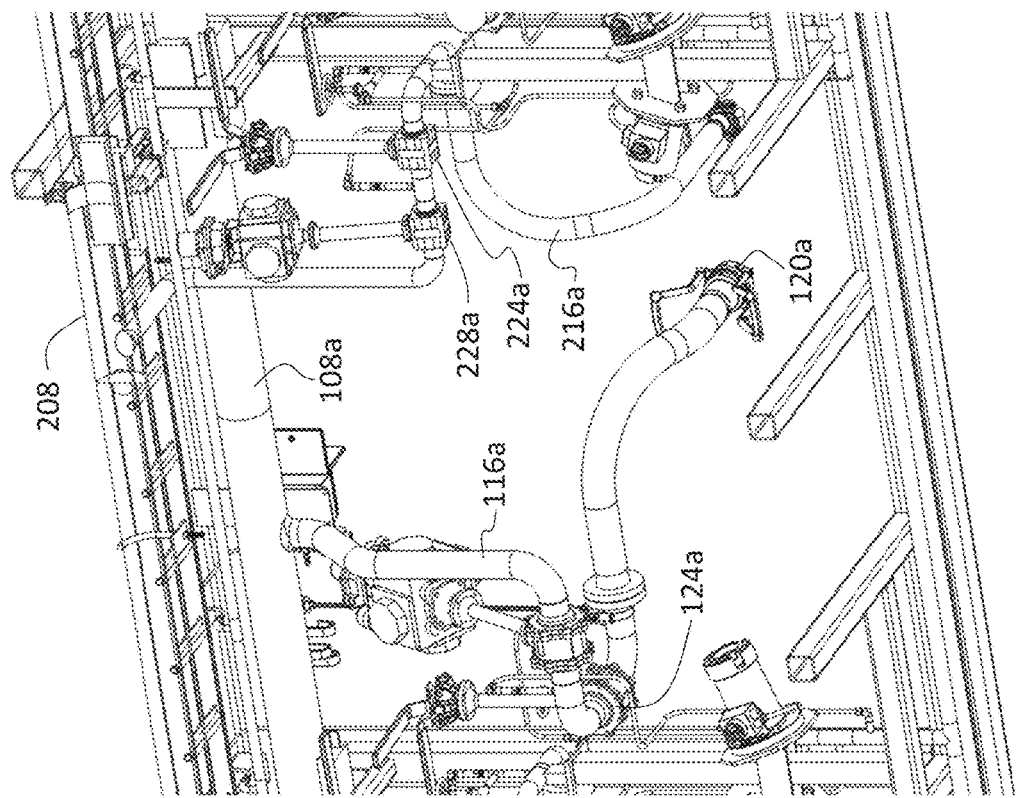
FIG. 2G depicts a cutaway, lower right perspective view of the rear of the connection bay of FIG. 2A.
Figure 2J:
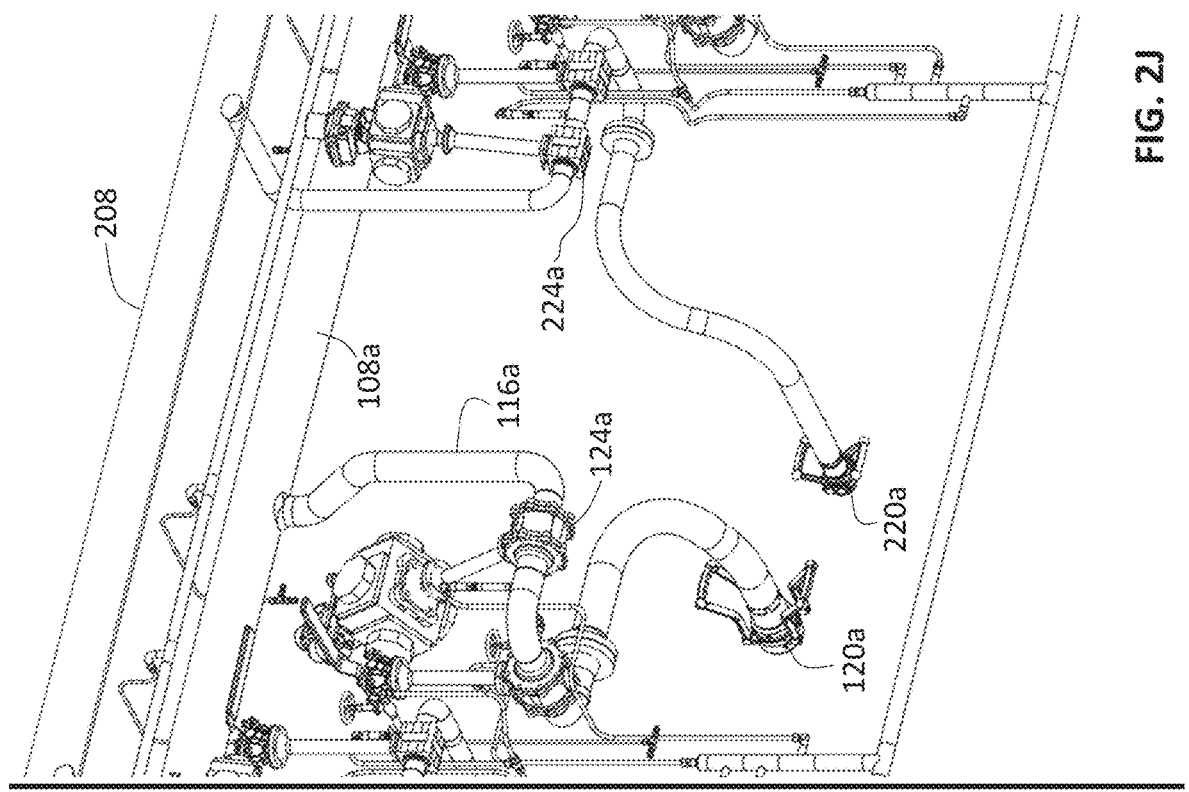
FIG. 2J depicts a cutaway, lower left perspective view of the piping systems of FIG. 2B.
Figure 2I:
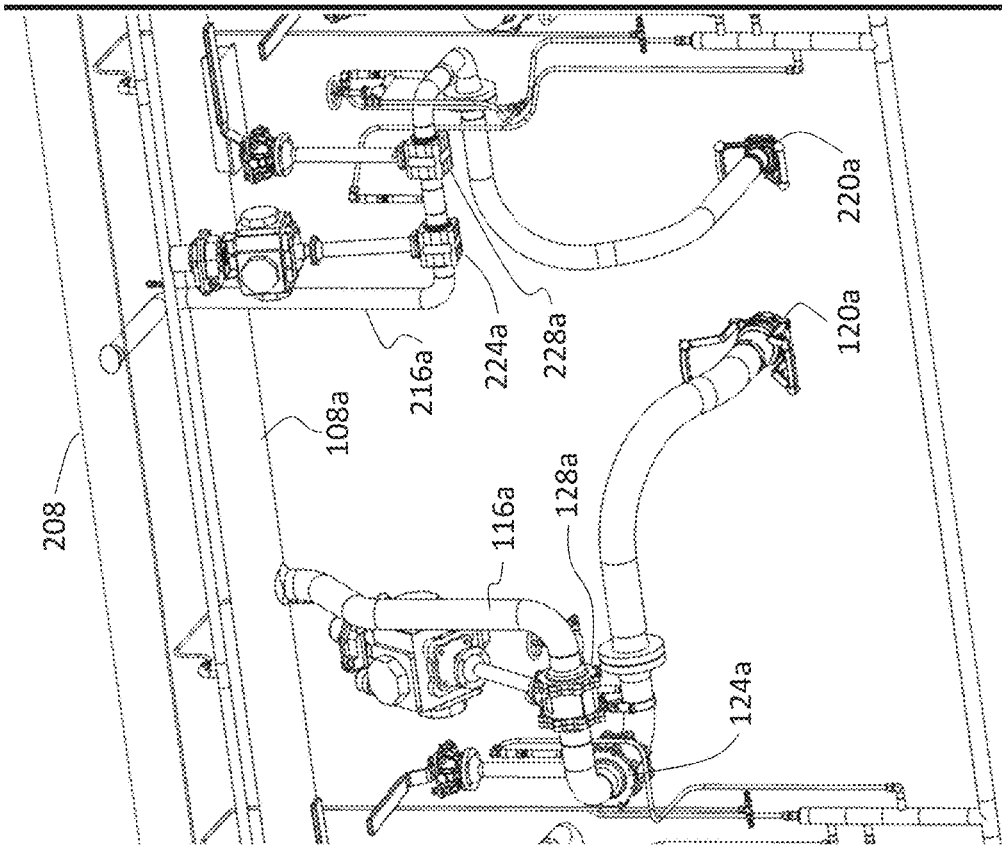
FIG. 2I depicts a cutaway, lower right perspective view of the rear of the piping systems of FIG. 2B.
Figure 3B:
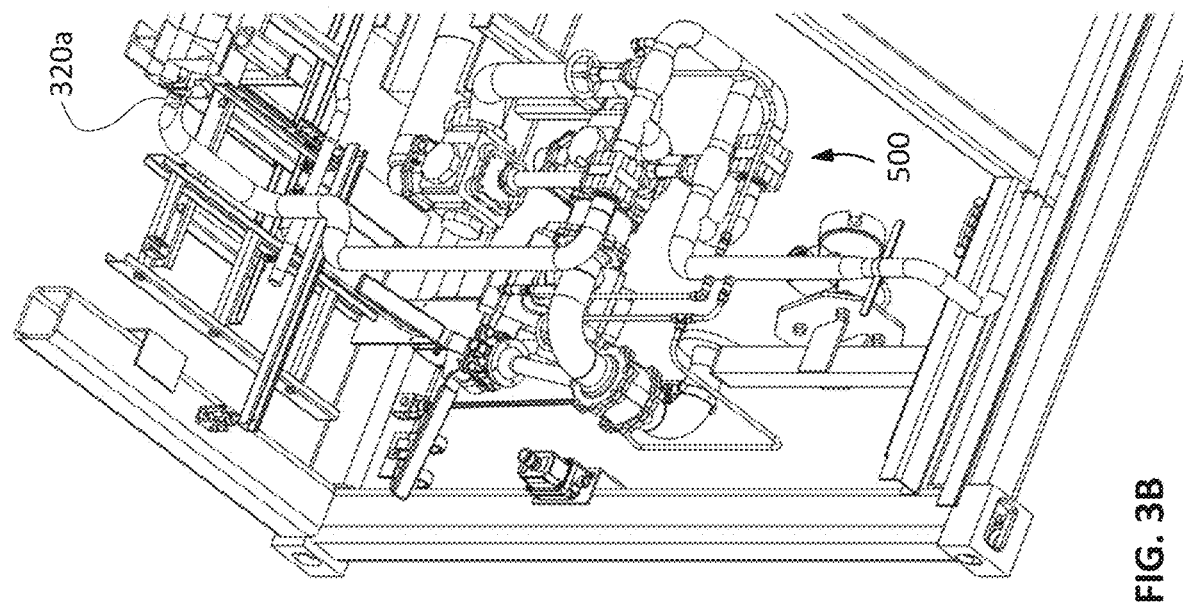
FIG. 3B is a lower right perspective view of the rear of the crossover system of FIG. 3A.
Figure 3A:
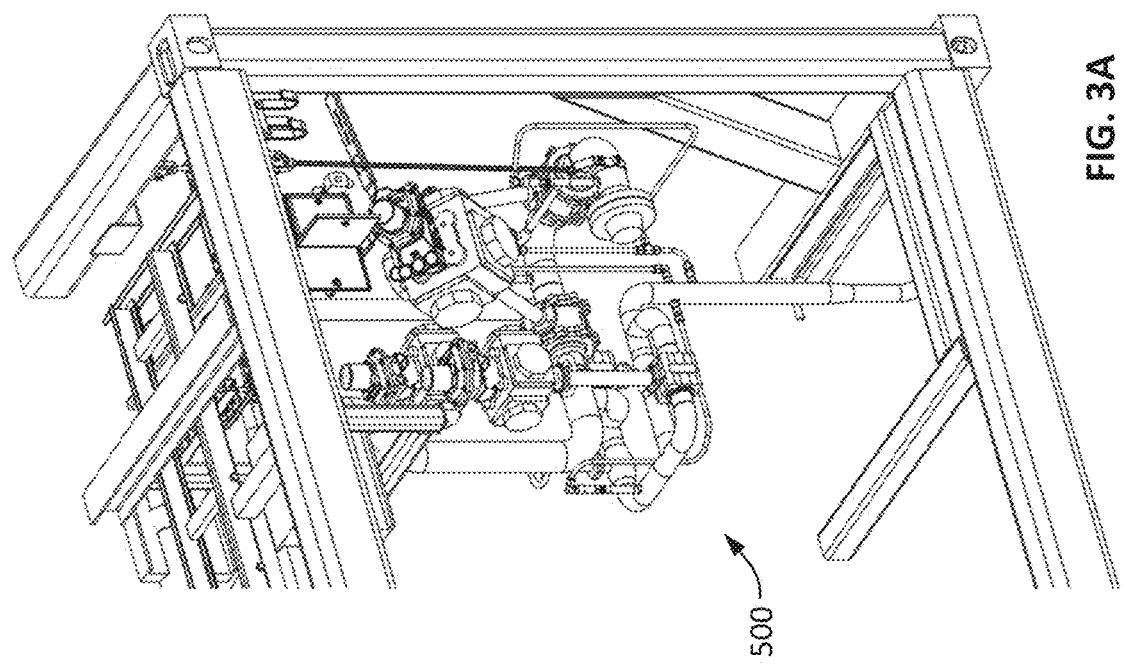
FIG. 3A is an upper left perspective view of a portion of the apparatus of FIG. 1A showing a crossover system of the apparatus.
Figure 3D:
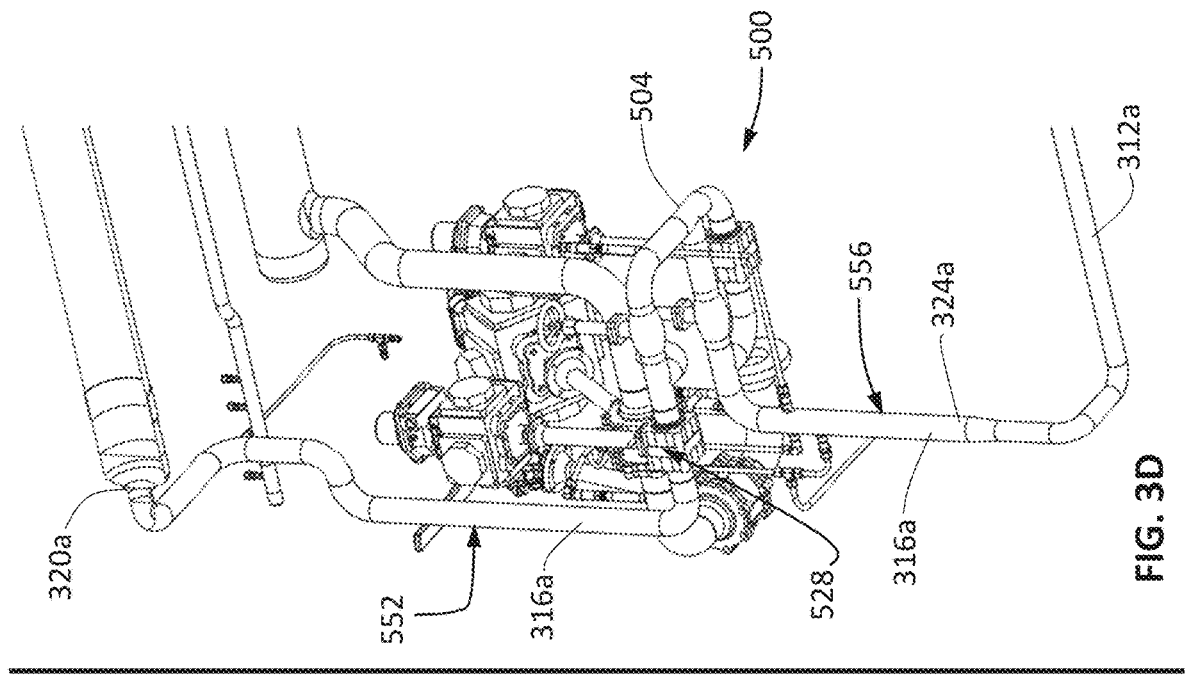
FIG. 3D is a lower right perspective view of the rear of the piping systems of FIG. 3C, omitting certain elements for illustration.
Figure 3C:
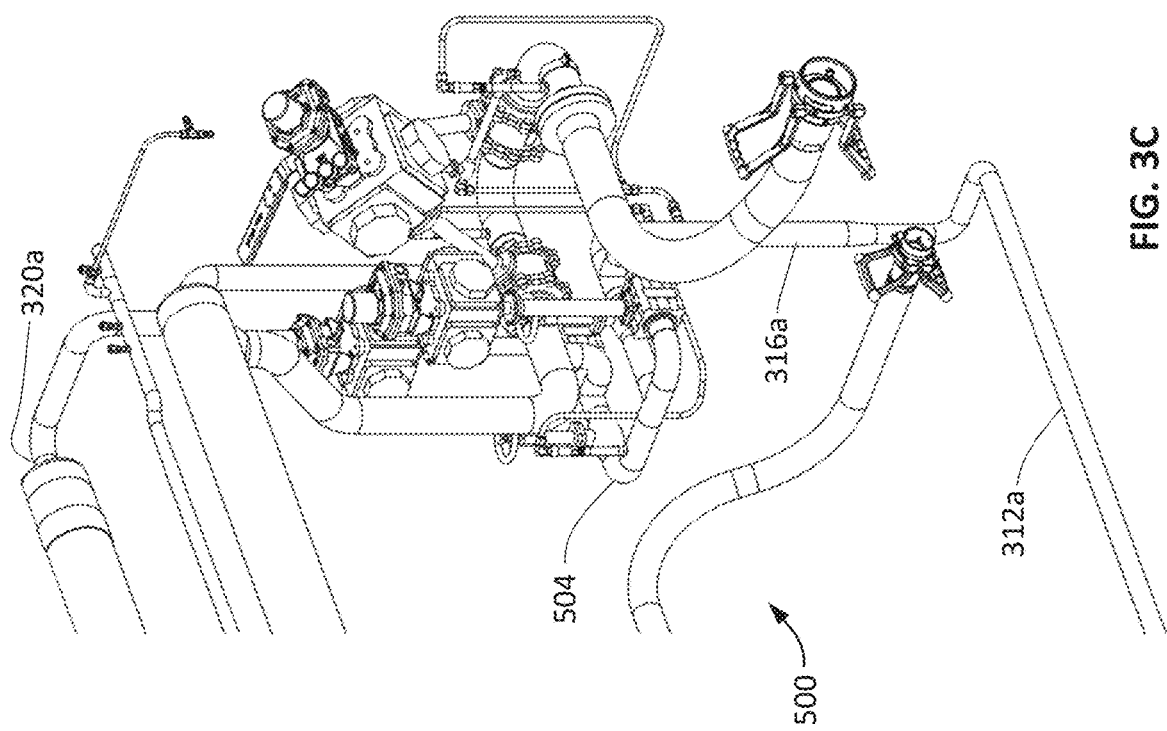
FIG. 3C is an upper left perspective view of certain piping systems of the apparatus, including the crossover system of FIG. 1A.
Figure 3E:
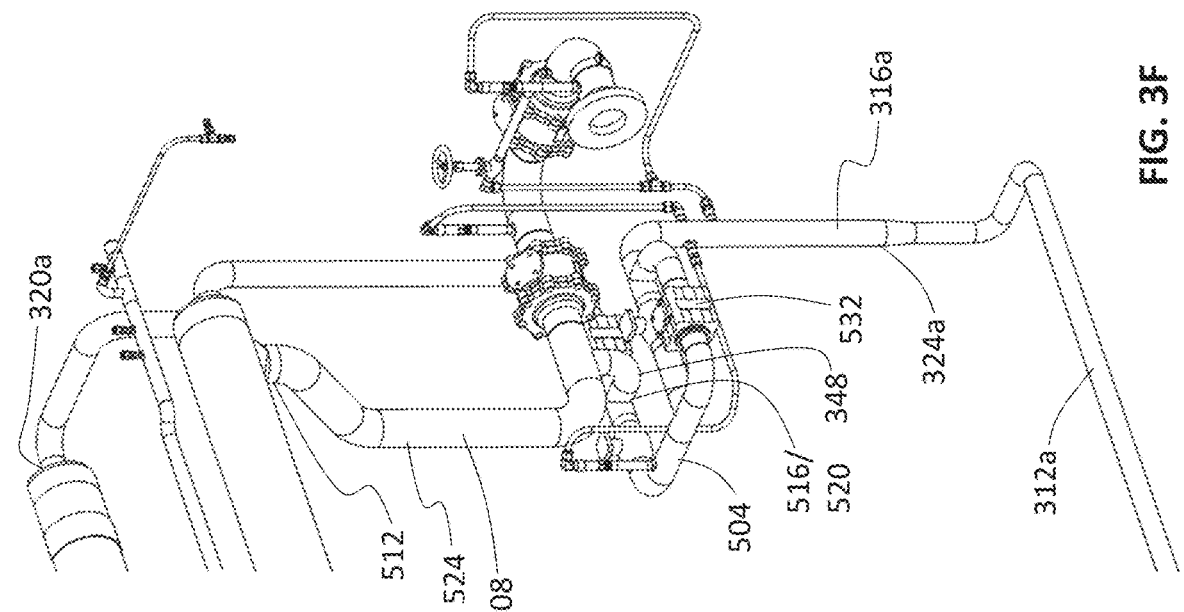
FIG. 3E is an upper left perspective view of the piping systems of FIG. 3C, omitting certain additional elements for illustration.
Figure 3F:
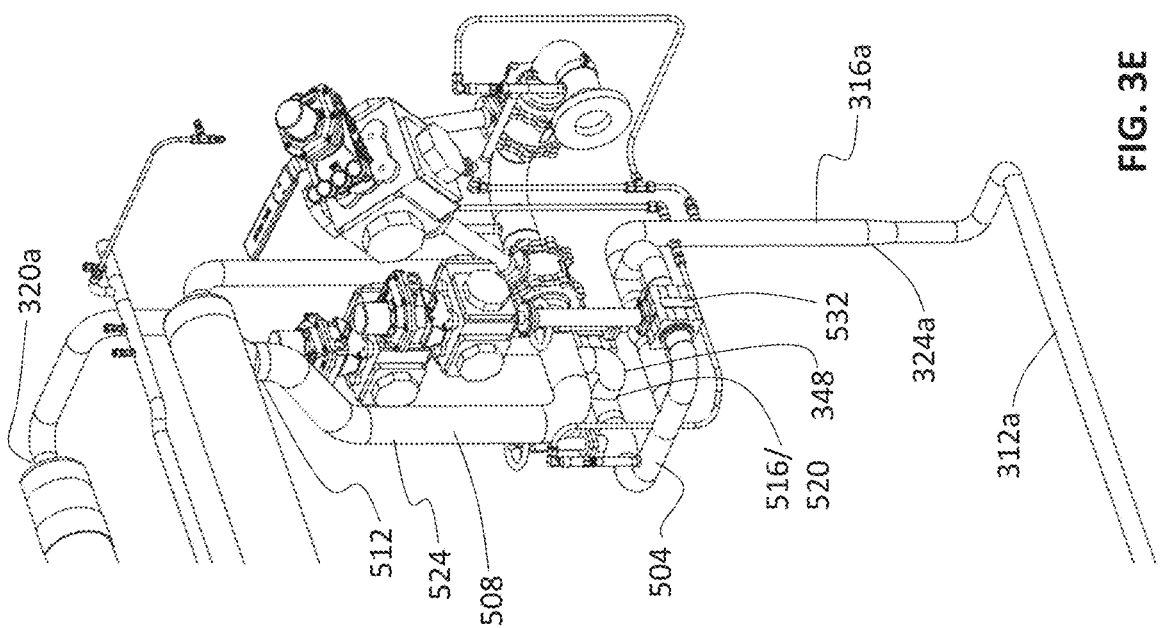
FIG. 3F is an upper left perspective view of the piping systems of FIG. 3C, omitting certain additional elements for illustration.
Figure 3H:
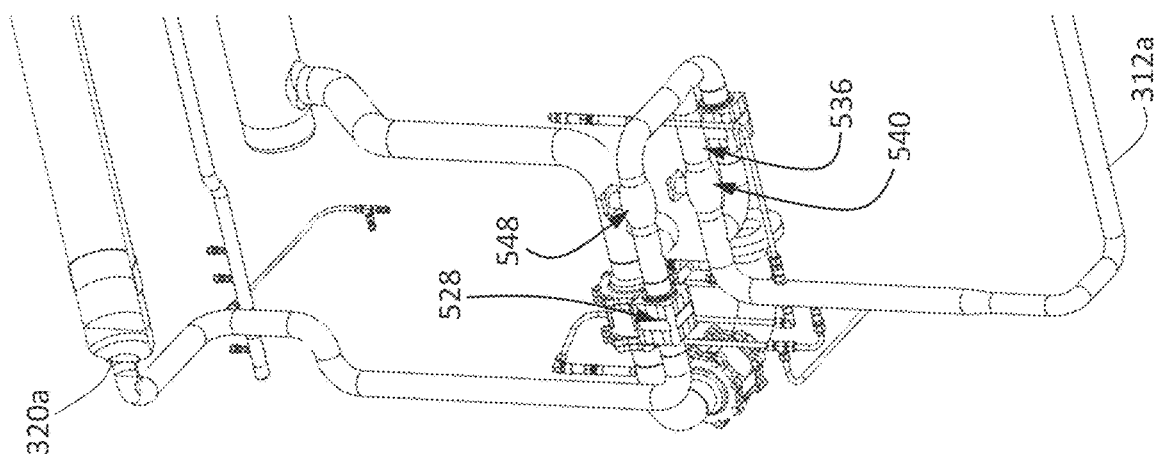
FIG. 3H is a lower right perspective view of the rear of the piping systems of FIG. 3C, further omitting the valve actuators for illustration.
Figure 3G:
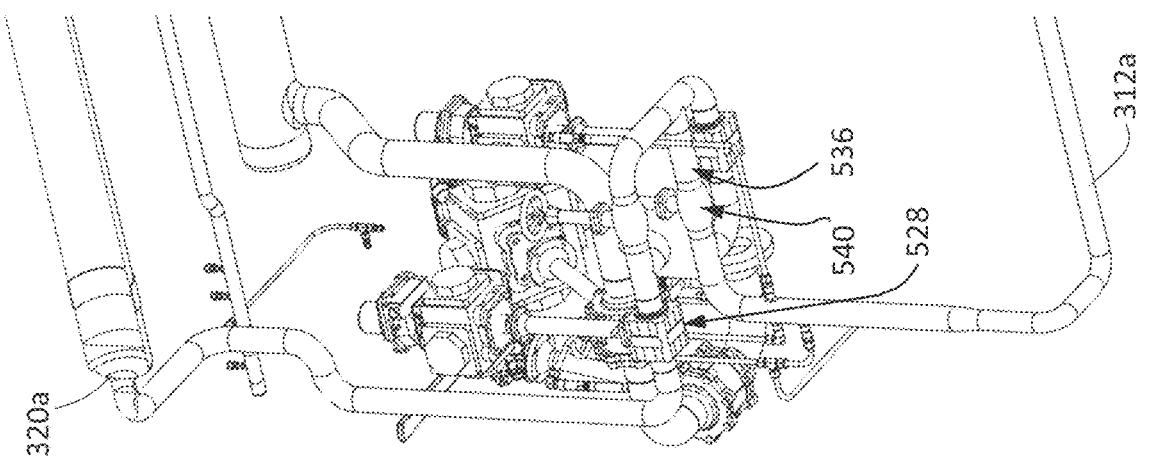
FIG. 3G is a lower right perspective view of the rear of the piping systems of FIG. 3C, omitting certain tank connection conduits for illustration.

As shown in FIG. 1G, apparatus 10 also comprises a control panel 70 that has at least having a power connection and a communication connection configured to be connected to respective power sources and communication lines of a marine vessel on which the apparatus is used. Within the control panel is a controller (e.g., processor, field-programmable gate array (FPGA), or the like) that is configured to actuate the remotely controllable liquid valves 128*a* and remotely controllable vent valves 228*a*, such as in response to signals received from a control room of a marine vessel via the communications connection. For example, the controller can be configured to operate as a "slave" in a "master-slave" relationship with a "master" controller of the marine vessel, such that the controller actuates the valves in accordance with control signals received from the master controller of the marine vessel via the communication connection.

In some embodiments, apparatus 10 further comprises a plurality of sensor lines for each liquid branch line 116*a*, 116*b*, which sensor lines each has a first end coupled to the controller of the control panel, and a second end configured to be coupled to a sensor of a container to which the corresponding liquid branch line is connected. In such embodiments, the controller can be further configured to receive signals from the sensors of the container and to transmit signals indicative of the signals via the communication connection of the control panel, for example, to the master controller of the marine vessel. By way of example, in some configurations, each plurality of sensor lines comprises a first pair of sensor lines configured to be coupled to a first differential pair of pressure sensors on the container; and a second pair of sensor lines configured to be coupled to a second differential pair of pressure sensors on the container. In at least some embodiments, the present apparatuses (e.g., 10, 10*a*) do not include flow meters capable of measuring flow into individual tanks (or any flow meters at all capable of measuring the flow of LNG into the liquid system 100).

FIGS. 4A-4C and 5A-5E depict an example of a marine vessel 600 carrying a plurality of the present ISO container manifold apparatuses (e.g., 10) and a plurality of ISO tank containers 74 configured to store LNG. As will be appreciated by those skilled in the art, each ISO tank container 74 has a bottom, a top, first and second ends each having a common width that is a nominal 8 feet. Additionally, each ISO tank container has a liquid connection and a safety vent connection, and the first end of the ISO tank container is configured to permit access to the liquid connection and the vent connection. In this configuration, the manifold apparatuses and ISO tank containers 74 are arranged in two substantially similar layers with one stacked on top of the other. Each such layer includes a first apparatus 10 with ten (10) container connection bays, and a second apparatus 10*a* with only five (5) container connection bays. Each layer further includes a first plurality 604*a* of ISO tank containers 74 arranged side to side with each of their first ends facing first side 42 of apparatus 10, with the liquid connection of each ISO tank container coupled in fluid communication to a respective one of the first liquid branch connections 120*a* of apparatus 10, and the vent connection of each ISO tank container coupled in fluid communication to a respective one of the first vent connections 220*a* of apparatus 10. Each layer further includes a second plurality 604*b* of ISO tank containers 74 arranged side to side with each of their first ends facing second side 46 of apparatus 10, with the liquid connection of each ISO tank container coupled in fluid communication to a respective one of the first liquid branch connections 120*a* of apparatus 10, and the vent connection of each ISO tank container coupled in fluid communication to a respective one of the first vent connections 220*a* of apparatus 10. Each layer further includes a third plurality 604*c* of ISO tank containers 74 arranged side to side with each of their first ends facing second side 46 of apparatus 10*a*, with the liquid connection of each ISO tank container coupled in fluid communication to a respective one of the liquid branch connections 120*b* of apparatus 10*a*, and the vent connection of each ISO tank container coupled in fluid communication to a respective one of the first vent connections 220*b* of apparatus 10.

For each apparatus 10, 10*a*, the liquid trunk connection(s) (112*a*, 112*b*) is/are connected to the LNG system of vessel 600, the vent trunk connection (212) is connected to the vent system of vessel 600, the drain trunk connection 328 is connected to a knockout drum or other drain reservoir of vessel 600, and the pneumatic trunk connection 416 is connected to a source of pressurized pneumatic fluid aboard vessel 600. Additionally, for each apparatus 10, 10*a*, the control panel is coupled via a respective communication link to a master controller of the vessel such that the control panel can receive control signals from the master controller to operate the apparatus (e.g., open and close remotely actuatable valves of the apparatus).

Figure 6:
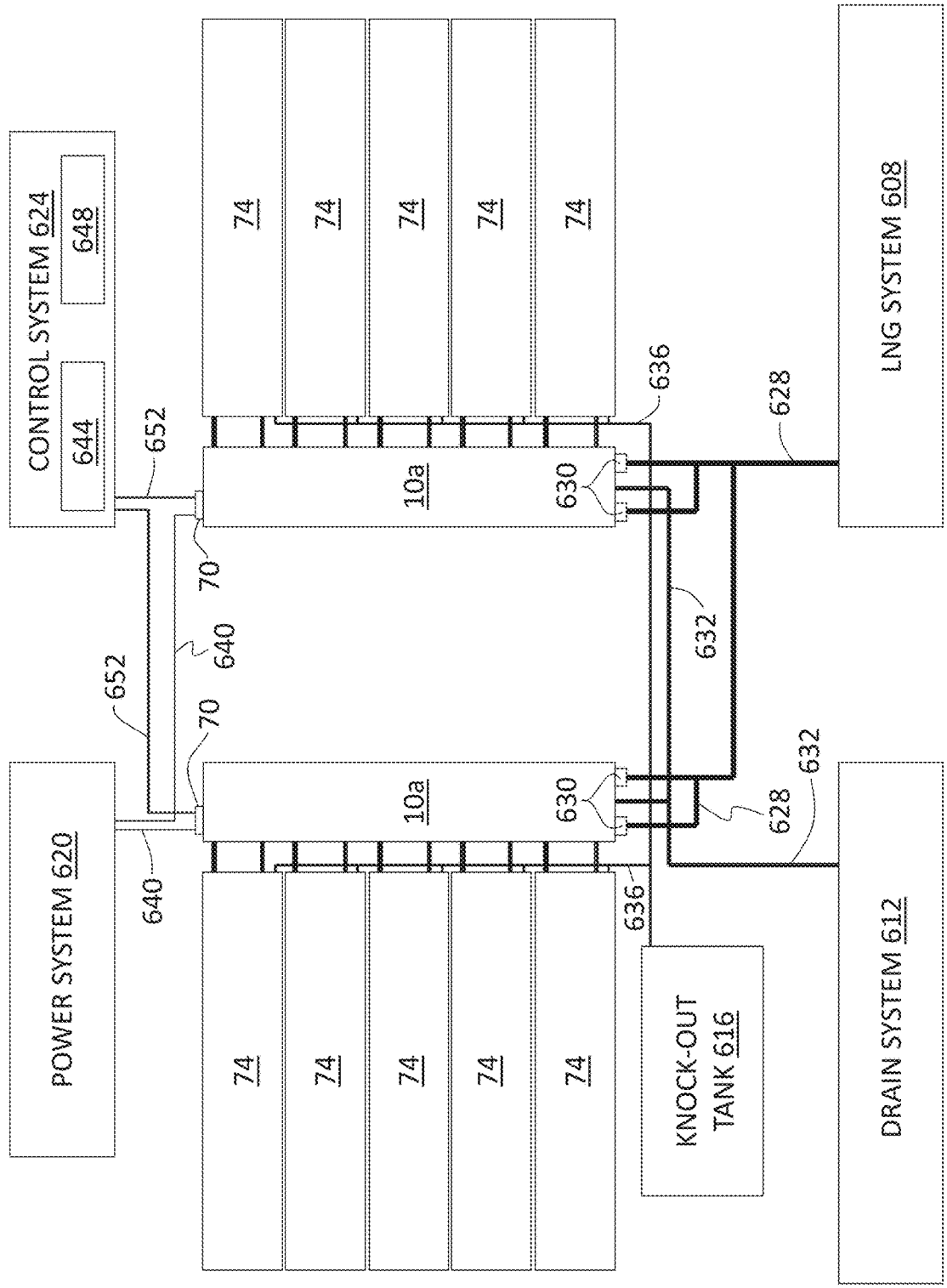
FIG. 6 is a block diagram of a second example of a system of a marine vessel carrying a plurality of the present modular manifold apparatuses and a plurality of ISO tank containers.

FIG. 6 is a block diagram of a second example of a system of a marine vessel carrying a plurality of the present modular manifold apparatuses 10*a* and a plurality of ISO tank containers 74. While shown with apparatuses 10*a* (each connected to five containers 74) for illustration purposes, the system can additionally or alternatively include apparatuses 10 and a correspondingly larger number of containers 74 (e.g., up to ten containers 74 per apparatus 10). As shown, the marine vessel includes an LNG system 608, a vent system 612, a drain system 616, a power system 620, and a control system 624.

LNG system 608 can include various components to transport LNG to and from containers 74 via apparatuses 10*a* and/or to and from the vessel itself, such as, for example, pumps and/or external LNG connections for transporting LNG from to or from an external LNG source (e.g., a floating storage unit (FSU)). In at least some vessels, LNG system 608 includes additional reservoirs on board the vessel (e.g., below deck) in which additional LNG can be stored, for example during transport of the vessel itself and/or temporarily during loading and unloading of containers 74. As shown, LNG system 608 includes distribution lines 628 configured to be connected to the liquid trunk connections (e.g., 112a, 112b) of the modular manifold apparatuses 10a to communicate LNG to and from the apparatuses (and corresponding containers 74) to the LNG system of the vessel. In this configuration, each liquid trunk connection (e.g., 112a, 112b) includes a valve 630 at each liquid trunk connection such that LNG can be permitted to flow or prevented from flowing between the distribution lines 628 and the liquid trunk lines of the apparatus. Each valve 630 can be a fireblock valve that is configured to shut down the flow of LNG to the apparatus in the event of fire. For example, each valve 630 can be configured to automatically close if pneumatic pressure to the valve drops or if it receives a signal to close (e.g., when the vessel's emergency shut down (ESD) system is activated, but can be remotely reset and thereby opened in response to a signal received from the vessel's control system 624.

Vent system 612 can include various components such as pumps to receive natural gas vapor from containers 74 via apparatuses 10a and transport such gas to a reservoir or release point. In at least some vessels, vent system 612 includes a vapor reservoir to contain such vapor until such time as the vapor can be safely vented to atmosphere or liquefied. For example, vent system 612 may in some instances include one or more boilers or heaters to increase the temperature of the vapor before venting to ensure that the released vapor is less dense than atmospheric air and therefore will not settle back down onto the ship (and potentially into habitable spaces where it displace oxygen and, in extreme cases, risk asphyxiating crew members). As shown, vent system 612 includes collection lines 632 configured to be connected to the vent trunk connections 212 of the modular manifold apparatuses 10a to communicate vapor from the apparatuses (and corresponding containers 74) to the vent system of the vessel.

Drain system 616 includes a reservoir or knock-out tank to receive liquids that leak and/or otherwise collect in the drain pans of apparatus 10a. As shown, drain system 616 includes collection lines 636 configured to be connected to the drain trunk connections 328 of the modular manifold apparatuses 10a to communicate collected liquids from the apparatuses (and corresponding containers 74) to the knock-out tank of the drain system.

Power system 620 can include various components such as generators to deliver electric power to apparatuses 10a. As shown, power system 620 includes a plurality of power distribution lines 640 configured to be connected to the apparatuses (e.g., via control panels 70) to power the apparatuses.

Control system 624 can include various components to send control signals to the apparatuses (e.g., to control panels 70) to control the remotely actuatable valves and other components of the apparatuses, and to receive signals from sensors on the apparatus and/or the corresponding containers 74. As shown, control system 624 includes a memory 644 and a controller 648, such as a processor or field-programmable gate array (FPGA), to read and execute instructions from the memory 644 to implement some or all of the steps and/or actions described herein. Control system 624 can be implemented as a computer, such as including a display and user input to allow a user to monitor and control the operation of apparatuses 10a and containers 74, or as a server that communicates with separate computer workstations or user interfaces through which users interact with the apparatuses and containers. As shown, control system 624 includes a plurality of communication lines 652 configured to be connected to the apparatuses (e.g., via control panels 70) to communicate signals between the apparatuses and the control system 624.

As will be appreciated by those of skill in the art, some or all of the various steps and actions described herein can be programmed in the form of machine readable instructions in memory 644 that can be executed by controller 648, for example, to receive (via control panels 70) signals from sensors on apparatuses 10a and corresponding containers 74; to display to a user various characteristics—such as fill level, temperature, and/or pressure—of the apparatuses, corresponding containers, and/or LNG in such containers); and/or to send (via control panels 70 and communication lines 652) control signals to the apparatuses, such as, for example, to actuate the various remotely actuatable valves on each apparatus.

Figure 7:
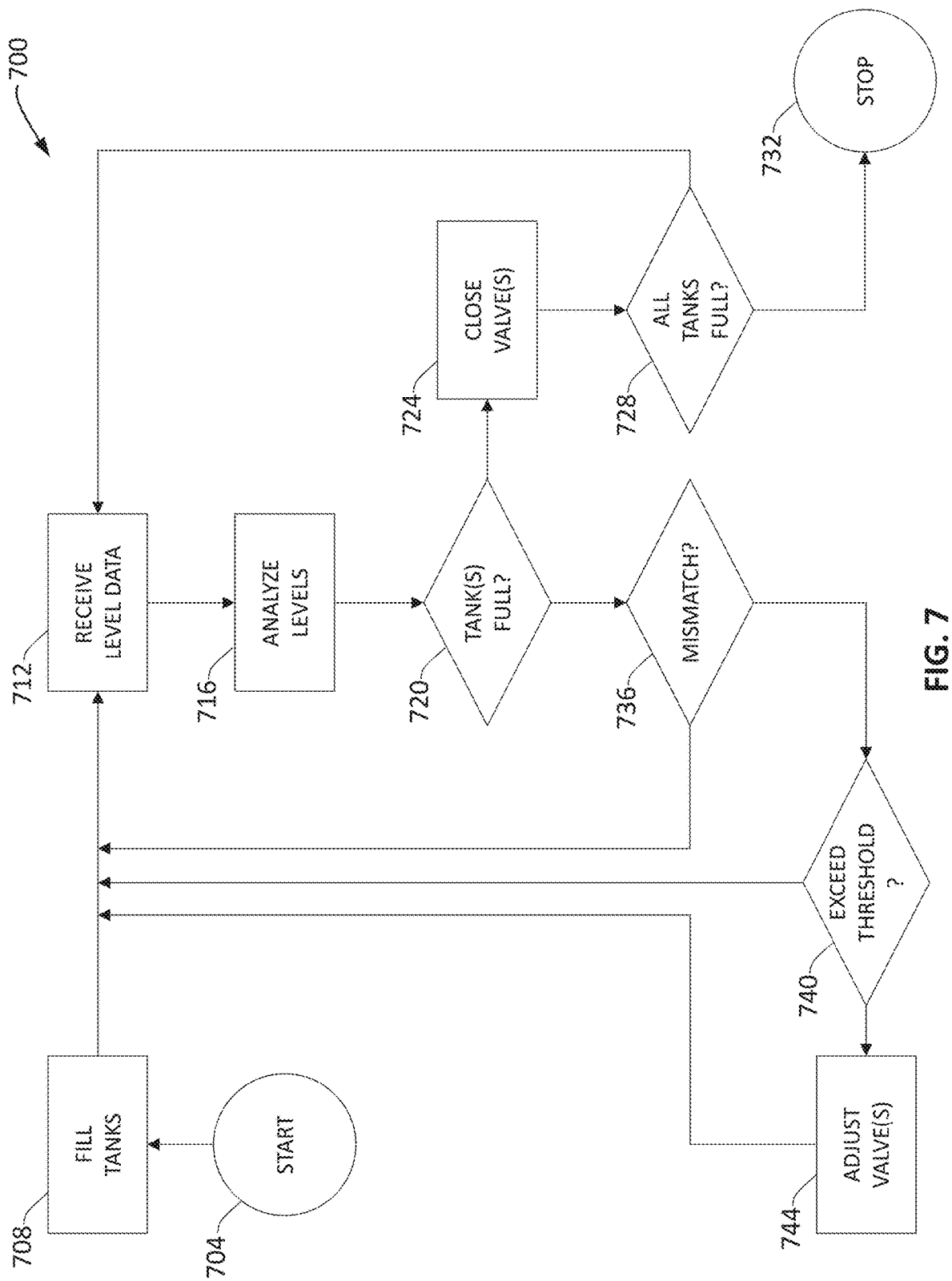
FIG. 7 is a flowchart illustrating an example control method that includes several aspects of controlling the present systems.

FIG. 7 is a flowchart illustrating an example of a method 700 that includes several aspects of controlling the present systems, which aspects may be implemented together (as shown) or separately in various combinations. As shown, method 700 is initiated 704 and, at a step 708, involves filling the containers (74) connected to a particular modular manifold apparatus (e.g, 10, 10a), such as by delivering LNG to the liquid trunk connections (e.g., 112a, 112b) of the apparatus. Filling at step 708 can include filling the containers associated with one or a plurality of the manifold apparatuses. For example, when containers are disposed on a vessel in multiple levels or stacks, such as in FIGS. 4A-4C, filling at step 708 can begin with filling the containers in the first level, after which the containers in the second level can be filled.

At step 712, the fill levels of the containers being filled is checked or monitored. For example, each container 74 can include at least a first upper pressure sensor and a first lower pressure sensor connected to corresponding sensor lines of the respective manifold apparatus (e.g., 10, 10a) and a fill level of each container can be determined by measuring the pressure at the first lower pressure sensor (which includes both the "head" or pressure due to the depth of LNG liquid in the container, and the vapor pressure above the LNG liquid level) and subtracting the pressure at the first upper pressure sensor (which includes only the vapor pressure above the LNG liquid level), and the depth can be derived by dividing the resulting pressure difference by the density of the LNG. For example, when method 700 is implemented in an automated or semi-automated way via a vessel control system (e.g., 624), the control system can receive signals from the first and second pressure sensors of a container— such as via the control panel of the corresponding manifold apparatus and communication lines (e.g., 652)—and derive the LNG liquid levels for that container. The control system can similarly determine the LNG liquid levels each of the containers being filled. In some embodiments, each container can also include a second upper pressure sensor and a second lower pressure sensor, for example at a second location of the container than the first upper and lower pressure sensors, such that the LNG liquid level can be determined at the second location. By determining LNG liquid level at two different locations, the determined LNG liquid depths can averaged to account for non-level orientations of the vessel (and container), such as due to waves or the like. Additionally, and particularly as the container approaches a full state, determining LNG liquid depth at two different points can help eliminate the possibility of prematurely concluding that the container is full (e.g., if the container is angled such that the differential pressure readings of a first pair of the pressure sensors indicates that the container is full but the other differential pressure readings of a second pair of sensors indicates otherwise. In at least some embodiments, the present methods (e.g., 700) do not include measuring the flow of LNG into the liquid system 100 via flowmeters or load cells (e.g., only via differential pressure sensors).

When simultaneously filling multiple containers, particularly aboard a seagoing vessel, it can be important to fill the containers at substantially similar rates, for example to maintain even weight distribution across the vessel and thereby reduce the likelihood of the vessel tilting or listing to one side. At a step 716, the level data in any two or more containers being filled can be analyzed and, at a step 720, a determination can be made as to whether any of the containers is/are full. If one or more of the containers is full (i.e., is filled to or beyond a desired fill level), then the process proceeds to a step 724 at which a valve (e.g., 128a, 128b) in the liquid branch line (e.g., 116a, 116b) corresponding to each full container is closed to prevent further LNG from flowing into the full container(s). The process then proceeds to a step 728 at which a determination is made as to whether all of the containers being filled are full. If all containers are full, then the process stops at step 732 at which all corresponding liquid branch line valves (e.g., 128a, 128b) corresponding to the full containers are closed, and valves 630 are also closed. If one or more of the containers being filled are not yet full, then filling continues and the process reverts to step 712 and fill levels continue to be monitored.

If instead at step 720, a determination is made that none of the containers are yet full, then the process proceeds to a step 736 at which a determination is made as to whether one or more of the containers being filled is/are filling faster than others of the containers such that a mismatch in fill levels exists between two or more of the containers. If a mismatch in fill levels is not detected, then filling continues and the process reverts to step 712 and fill levels continue to be monitored. If a mismatch is identified, then the process continues to a step 740 where the mismatch can be compared to a threshold to determine whether the mismatch is acceptable or requires correction. If the mismatch does not exceed a threshold (and is acceptable), then filling continues and the process reverts to step 712 and fill levels continue to be monitored.

If instead, the mismatch exceeds a predetermined threshold (e.g., 10% of the fill level of the less-filled one of the mismatched container), then the process proceeds to a step 740 at which one or more valves of the manifold apparatuses (e.g., 10, 10a) are adjusted to increase the fill rate of the less-filled container(s) and/or to decrease the fill rate of the more-filled container(s). For example, in embodiments of the manifold apparatus with liquid branch line valves (e.g., 128a, 128b) that can be throttled, then one or more of the liquid branch line valves can each be adjusted to increase or decrease the fill rate of a corresponding container. Additionally or alternatively, one or more of the vent branch line valves (e.g., 228a, 228b) corresponding to the more-filled container(s) can be closed to cause the pressure to rise in the corresponding containers and thereby slow the fill rate to such more-filled container(s). Once the valve(s) are adjusted at step 744, then filling continues and the process reverts to step 712 and fill levels continue to be monitored.

When method 700 is implemented in an automated or semi-automated way via a vessel control system (e.g., 624), the control system can send control signals to the valves to the be adjusted, closed, or opened—such as via the control panel of the corresponding manifold apparatus and communication lines (e.g., 652)—to adjust, close, or open particular valves.

In some implementations of the present methods, fill levels are determined in the aggregate for all containers 74 coupled to a given manifold apparatus and valves adjusted on a manifold-by-manifold basis, or on a per-liquid trunk line basis. For example, when adjusted on a manifold-by-manifold basis, then fill level differences between individual containers connected to a given manifold apparatus (e.g., 10, 10a) may be neglected and adjustments made based on a representative (e.g., average) fill level determined for all containers connected to the apparatus, compared to representative fill levels for any other manifold apparatuses through which containers are being simultaneously filled, and any corresponding valve adjustments made to the valves corresponding to all such containers connected to that apparatus. By way of further example, when adjusted on a per-liquid trunk line basis, a representative fill level determined for all containers connected to each liquid trunk line (e.g., 112a, 112b), compared to representative fill levels for each liquid trunk line of the other apparatuses through which containers are being simultaneously filled, and any corresponding valve adjustments made to the valves corresponding to all such containers connected to that liquid trunk line.

Figure 8:
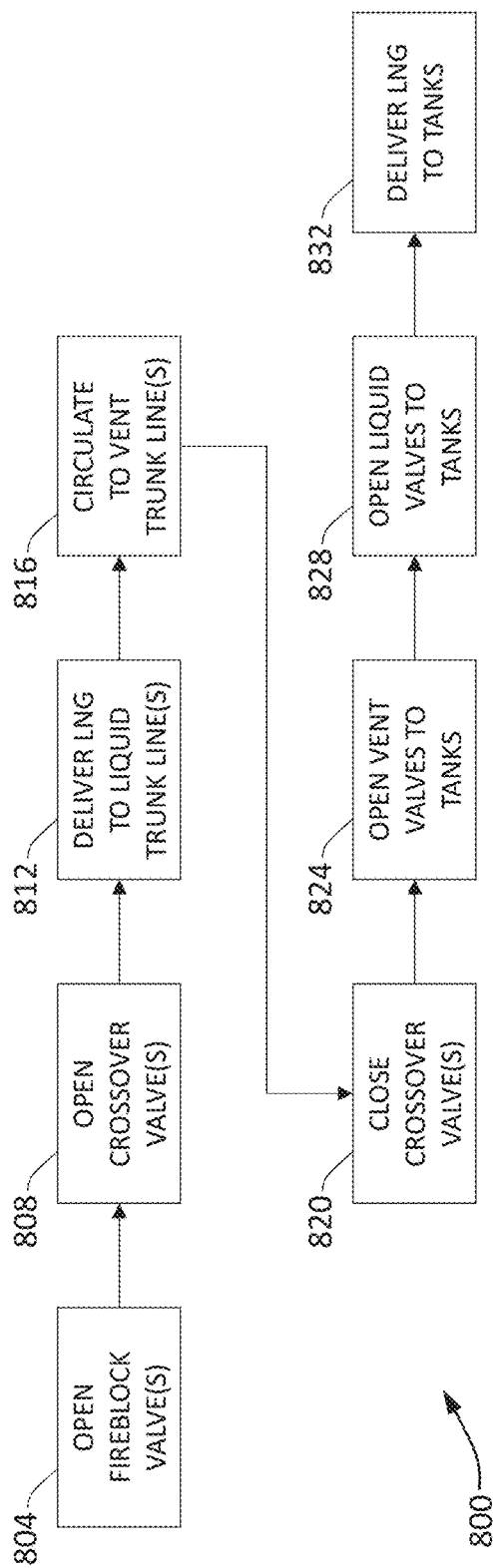
FIG. 8 is a flowchart illustrating an example filling method that includes several aspects of filling the containers of the present systems.

FIG. 8 is a flowchart illustrating an example filling method 900 that includes several aspects of filling the containers of the present systems. For example, method 800 can be implemented at filling step 708 of method 700 (FIG. 7). As shown, method 800 includes a step 804 of opening valves 630 at the liquid trunk connections (e.g., 112a, 112b) of the manifold apparatuses corresponding to the containers to be filled. To enable simultaneous pre-cooling of the liquid system 100 and vent system 200 of each manifold apparatus corresponding to the tanks to be filled, the process then proceeds to a step 808 at which the first crossover valve(s) 528 (FIGS. 3A-3H) are opened to permit fluid communication between the liquid trunk line(s) (e.g., 108a, 108b) and the vent trunk line (e.g., 208). At a step 812, LNG is then delivered from the vessel's LNG system (e.g., 608) to the liquid trunk connections (e.g., 112a, 112b) of the apparatuses corresponding to the containers to be filled, and the delivered LNG is then circulated through the first crossover valve to the vent system 200 of the manifold apparatus. As the LNG circulates, it absorbs thermal energy from the lines of the liquid system 100 and vent system 200 to thereby cool the liquid and vent systems, and a portion of the LNG will be vaporized. In some instances, circulation can be increased by also opening second crossover valve 532 (FIGS. 3A-3H) to also allow circulation of LNG to the drain system 300 of the manifold apparatus and thereby encourage flow through and thereby cooling of the liquid and vent systems.

Once the lines of the liquid system 100 and vent system 200 reach a desired temperature, first crossover valve(s) 628 is/are closed at a step 820 to again isolate the vent system from the liquid system. The process then proceeds to a step 824 at which the vent branch line valves (e.g., 228a, 228b) of the manifold apparatus are opened to allow excess gas to be removed from the containers during filling and, at a step 828, and the liquid branch line valve(s) (e.g., 128a, 128b) are opened to permit LNG to flow from liquid system 100 into the containers (e.g., 74) to be filled at step 832.

In some implementations, when containers aboard a vessel are filled sequentially in groups (e.g., first filling a plurality of containers in a lower layer of containers, next filling the plurality of containers in an upper layer of containers), then the pre-cooling process of steps 804-816 can be performed for the second plurality of containers, as the first plurality of containers is being filled. In this way, the liquid and vent systems of the manifold apparatuses of the second plurality of containers can be cooled and/or maintained at a desired temperature, while the first plurality of containers is being filled such that, upon reaching the filled state for the first plurality of containers, then the second plurality of containers are already cooled and delivery of LNG at filling rates can be switched directly from the first plurality of containers to the second plurality of containers. As such, this simultaneous-filling-and-cooling approach can reduce or eliminate the delay between filling the first plurality of containers and filling the second plurality of containers that may otherwise be required if cooling the second plurality of tanks began after concluding the filling of the second plurality of containers.

Figure 9:
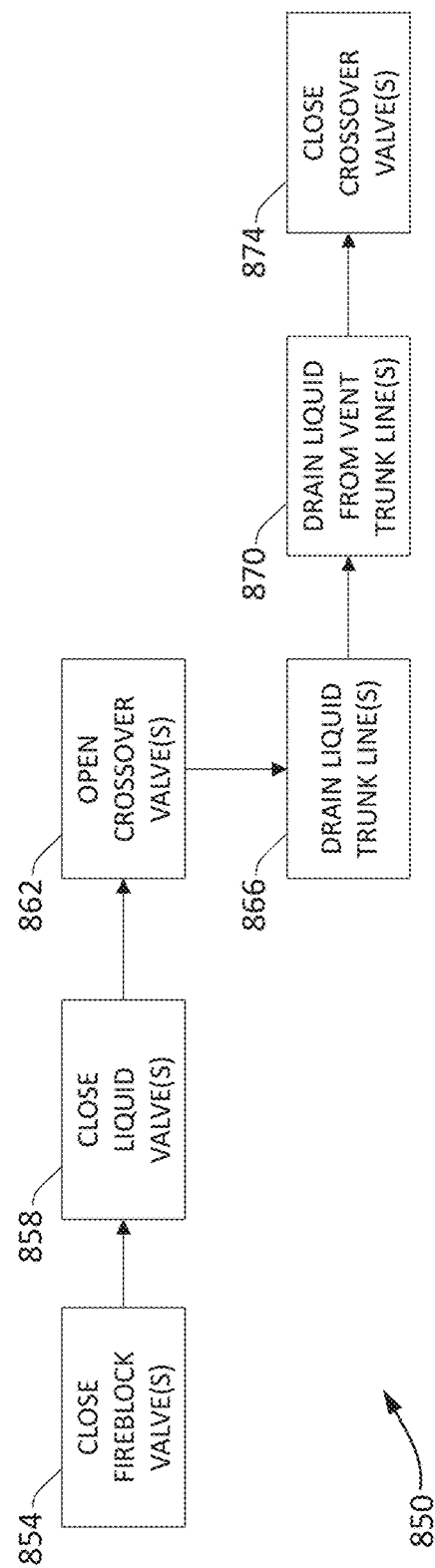
FIG. 9 is a flowchart illustrating an example termination method that includes several aspects of terminating the filling process for the tanks of the present systems.

FIG. 9 is a flowchart illustrating an example termination method 850 that includes several aspects of terminating the filling process for the containers of the present systems. For example, method 850 can be implemented at step 732 of method 700 (FIG. 7). Once the liquid branch valves (e.g., 316a, 316b) are closed for all containers being filled through a given manifold apparatus (e.g., 10, 10a), LNG can no longer flow into the containers connected to that manifold apparatus. At a step 854, the valve(s) (e.g., 630) at the liquid trunk connection(s) (e.g., 112a, 112b) of the manifold apparatus are closed to prevent further LNG from flowing into the liquid trunk lines (e.g., 108a, 108b). At this point, some residual LNG will be trapped in at least the liquid trunk line(s) (e.g., 108a, 108b), and the process can proceed to a step 862 at which the second crossover valve(s) 532 (FIGS. 3A-3H) of the manifold apparatus is/are opened to permit the trapped LNG to drain, at a step 866, from the liquid trunk line(s) into the liquid drain trunk lines (e.g., 312a, 312b) of the drain system of the manifold apparatus. In some embodiments, step 862 also includes opening first crossover valve(s) 528 (FIGS. 3A-3H) to permit any residual liquid in the vent trunk line (e.g., 208) to drain into the liquid drain trunk lines at step 870. The process then proceeds to a step 874 at which the previously opened crossover valve(s) (e.g., 528, 532) are closed to again isolate the drain trunk line from the vent and liquid trunk lines.

As described above for method 700, when method 800 and/or method 850 is/are implemented in an automated or semi-automated fashion via a vessel control system (e.g., 624), the control system can send control signals to the valves to the be adjusted, closed, or opened—such as via the control panel of the corresponding manifold apparatus and communication lines (e.g., 652)—to adjust, close, or open particular valves. The ability to remotely actuate the valves can reduce the need for (and time associated with) vessel crew manually opening and closing valves, and doing so in an automated or semi-automated way can reduce the potential for human error in opening and closing such valves.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

Representative Embodiments

The following includes representative embodiments of the present modular manifold apparatuses and systems.

Embodiment 1. A method for monitoring liquid natural gas (LNG) fill levels in at least first and second pluralities of ISO tank containers on a marine vessel having a central computer system, each plurality of ISO tank containers connected to a respective LNG manifold apparatus having a control panel, a plurality of liquid connections, a plurality of vent connections, and a plurality of sensor lines in electrical communication with the control panel, each ISO tank container having liquid and vent connections that are connected to corresponding liquid and vent connections of the respective LNG manifold apparatus, each ISO tank container further having at least a first upper pressure sensor and a first lower pressure sensor connected to corresponding sensor lines of the respective LNG manifold apparatus, where the control panels is in electrical communication with the central computer system via a respective communication line, the method comprising:

during simultaneous filling of the plurality of ISO tank containers, receiving at a central computer system via the communication lines sensor signals from the first upper and lower pressure sensors of each of at least a portion of the first plurality of ISO tank containers and from the first upper and lower pressure sensors of each of at least a portion of the second plurality of ISO tank containers;

determining from the sensor signals a fill level in each of the ISO tank containers for which sensor signals are received.

Embodiment 2. The method of Embodiment 1, further comprising:

comparing the determined fill levels of the ISO tank containers to identify any mismatches in fill levels that exceed a threshold value.

Embodiment 3. The method of Embodiment 1, where each LNG manifold apparatus includes a plurality of variable shutoff valves each configured to throttle flow through the liquid connections of the LNG manifold apparatus, the method further comprising:

in response to determining that a fill level difference between a first one of the ISO tank containers and a second one of the ISO tank containers exceeds the threshold value during simultaneous filling of the first and second ISO tank containers, varying the shutoff valve corresponding to the first ISO tank container and/or the shutoff valve corresponding to the second ISO tank container to reduce flow into the first ISO tank container relative to flow into the second ISO tank container.

Embodiment 4. The method of Embodiment 3, further comprising:
in response to determining that a fill level difference between the second ISO tank container and a third one of the ISO tank containers exceeds the threshold value during simultaneous filling of the first, second, and third ISO tank containers, varying the shutoff valve corresponding to the first ISO tank container, the shutoff valve corresponding to the second ISO tank container, and/or the shutoff valve corresponding to the third ISO tank container to reduce flow into the second ISO tank container relative to flow into the third ISO tank container.

Embodiment 5. The method of Embodiment 1, where each LNG manifold apparatus includes a plurality of variable shutoff valves each configured to throttle flow through the liquid connections of the LNG manifold apparatus, the method further comprising:
in response to determining that a fill level difference between any two of the first and second pluralities of ISO tank containers exceeds the threshold value during simultaneous filling of at least one of the first plurality of ISO tank containers and at least one of the second plurality of ISO tank containers, varying one of more of the shutoff valves to reduce flow into the ISO tank with a higher fill level of the two ISO tank containers for which the fill level difference was determined.

Embodiment 6. The method of any of Embodiments 3-5, where the variable shutoff valves are each coupled to the corresponding control panel via valve control lines and are remotely actuatable via control signals received through the control panel, where determining is performed by the central computer system, and where varying the shutoff valves comprises sending from the central computer system control signals to the respective shutoff valves via the control panel of the respective LNG manifold apparatus.

Embodiment 7. The method of Embodiment 1, where each LNG manifold apparatus includes a plurality of vent shutoff valves each configured to prevent or permit flow through the vent connections of the LNG manifold apparatus, the method further comprising:
in response to determining that a fill level difference between a first one of the ISO tank containers and a second one of the ISO tank containers exceeds the threshold value during simultaneous filling of the first and second ISO tank containers, closing the vent shutoff valve corresponding to the second ISO tank container to maintain or increase pressure in the second ISO tank container and thereby increase flow into the first ISO tank container relative to flow into the second ISO tank container.

Embodiment 8. The method of Embodiment 7, further comprising:
in response to determining that a fill level difference between the second ISO tank container and a third one of the ISO tank containers exceeds the threshold value during simultaneous filling of the first, second, and third ISO tank containers, closing the vent shutoff valves corresponding to the second and third ISO tank containers to maintain or increase pressure in the second and third ISO tank containers and thereby increase flow into the first ISO tank container relative to flow into the second and third ISO tank containers.

Embodiment 9. The method of any of Embodiments 7-8, further comprising:
in response to determining that a fill level difference between any two of the first and second pluralities of ISO tank containers exceeds the threshold value during simultaneous filling of at least one of the first plurality of ISO tank containers and at least one of the second plurality of ISO tank containers, closing one of more of the vent shutoff valves to maintain or increase pressure in the ISO tank container with the lower fill level of the two ISO tank containers for which the fill level difference was determined and thereby increase flow into the other of the two ISO tank containers.

Embodiment 10. The method of any of Embodiments 7-9, where the vent shutoff valves are each coupled to the control panel via valve control lines and are remotely actuatable via control signals received through the control panel, where determining is performed by the central computer system, and where varying the vent shutoff valves comprises sending from the central computer system control signals to the respective vent shutoff valves via the control panel of the respective LNG manifold apparatus.

Embodiment 11. A method for simultaneously filling at least first and second pluralities of ISO tank containers on a marine vessel with liquid natural gas (LNG), the vessel having a central computer system, each plurality of ISO tank containers connected to a respective LNG manifold apparatus having a control panel, a plurality of liquid connections, a plurality of vent connections, the liquid and vent connections being connected to corresponding liquid and vent connections of the respective LNG manifold apparatus, where each of the control panels is in electrical communication with the central computer system via a respective communication line, where each LNG manifold apparatus includes a plurality of variable shutoff valves each configured to throttle flow through one of the liquid connections of the LNG manifold apparatus, where the variable shutoff valves are coupled to the corresponding control panel via valve control lines and are remotely actuatable via control signals received through the control panel, the method further comprising:
sending control signals from the central computer system to the variable shutoff valve corresponding to a first one of the ISO tank containers and/or variable shutoff valve corresponding a second one of the ISO tank containers to vary one or more of the respective shutoff valves and thereby reduce flow into the first ISO tank container relative to flow into the second ISO tank container.

Embodiment 12. The method of Embodiment 11, where sending the control signals is performed in response to determining that a fill level difference between the first ISO tank container and the second ISO tank container exceeds a threshold value.

Embodiment 13. The method of any of Embodiments 11-12, where the first ISO tank container is one of the first plurality of ISO tank containers and the second ISO tank container is one of the second plurality of ISO tank containers.

Embodiment 14. The method of any of Embodiments 11-13, where sending the control signals comprises sending control signals from the central computer system to the shutoff valves corresponding to the first ISO tank container, the second ISO tank container, and/or a third one of the ISO tank containers to vary one or more of the shutoff valves and thereby reduce flow into the second ISO tank container relative to flow into the third ISO tank container.

Embodiment 15. The method of Embodiment 14, where the control signals are sent in response to determining that a fill level difference between the second ISO tank container and the third ISO tank container exceeds the threshold value during simultaneous filling of the first, second, and third ISO tank containers.

Embodiment 16. The method of any of Embodiments 11-15, further comprising:
in response to determining that a fill level difference between any two of the first and second pluralities of ISO tank containers exceeds the threshold value during simultaneous filling of at least one of the first plurality of ISO tank containers and at least one of the second plurality of ISO tank containers, sending control signals to one of more of the pneumatic valves to vary the respective shutoff valve(s) and thereby reduce flow into the ISO tank with a higher fill level of the two ISO tank containers for which the fill level difference was determined.

Embodiment 17. A method for simultaneously filling at least first and second pluralities of ISO tank containers on a marine vessel with liquid natural gas (LNG), the vessel having a central computer system, each plurality of ISO tank containers connected to a respective LNG manifold apparatus having a control panel, a plurality of liquid connections, a plurality of vent connections, the liquid and vent connections being connected to corresponding liquid and vent connections of the respective LNG manifold apparatus, where each of the control panels is in electrical communication with the central computer system via a respective communication line, where each LNG manifold apparatus includes a plurality of vent shutoff valves each configured to permit or prevent flow through one of the vent connections of the LNG manifold apparatus, where the vent shutoff valves are coupled to the corresponding control panel via pneumatic lines and are remotely actuatable via control signals received through the control panel, the method further comprising:
sending control signals from the central computer system to the vent shutoff valves corresponding to a first one of the ISO tank containers and/or the vent shutoff valve corresponding to a second one of the ISO tank containers to close one or more of the respective shutoff valves and thereby maintain or increase pressure in the second ISO tank container and reduce flow into the first ISO tank container relative to flow into the second ISO tank container.

Embodiment 18. The method of Embodiment 17, where sending the control signals is performed in response to determining that a fill level difference between the first ISO tank container and the second ISO tank container exceeds a threshold value.

Embodiment 19. The method of any of Embodiments 17-18, where the first ISO tank container is one of the first plurality of ISO tank containers and the second ISO tank container is one of the second plurality of ISO tank containers.

Embodiment 20. The method of any of Embodiments 17-19, where sending the control signals comprises sending control signals from the central computer system to the vent shutoff valves corresponding to the first ISO tank container, the second ISO tank container, and/or a third one of the ISO tank containers to close one or more of the shutoff valves and thereby maintain or increase pressure in the second and third ISO tank containers and increase flow into the first ISO tank container relative to flow into the second and third ISO tank containers.

Embodiment 21. The method of Embodiment 20, where the control signals are sent in response to determining that a fill level difference between the first ISO tank container and the third ISO tank container exceeds the threshold value during simultaneous filling of the first, second, and third ISO tank containers.

Embodiment 22. The method of any of Embodiments 17-21, further comprising:
in response to determining that a fill level difference between any two of the first and second pluralities of ISO tank containers exceeds the threshold value during simultaneous filling of at least one of the first plurality of ISO tank containers and at least one of the second plurality of ISO tank containers, sending control signals to one of more of the vent shutoff valves to close the respective shutoff valve(s) and thereby maintain or increase pressure in the ISO tank with a higher fill level of the two ISO tank containers for which the fill level difference was determined.

Embodiment 23. A method for remotely controlling fireblock valves of at least first and second pluralities of ISO tank containers on a marine vessel with liquid natural gas (LNG), the vessel having a central computer system, each plurality of ISO tank containers connected to a respective LNG manifold apparatus having a control panel, a plurality of liquid connections, a plurality of vent connections, the liquid and vent connections being connected to corresponding liquid and vent connections of the respective LNG manifold apparatus, where each of the control panels is in electrical communication with the central computer system via a respective communication line, where each ISO tank container includes a fireblock valve at the liquid connection of the ISO tank container and configured to automatically close in the presence of fire, where the fireblock valves are coupled to the corresponding control panel via valve control lines and are remotely openable via control signals received through the control panel, the method further comprising:
sending control signals from the central computer system to the fireblock valves corresponding to one or more of the ISO tank containers to open the respective fireblock valve(s).

Embodiment 23. A method for cooling liquid and vent connections a plurality of liquid natural gas (LNG) manifold apparatuses connected to ISO tank containers on a marine vessel, the vessel having a central computer system, each of the LNG manifold apparatuses having a control panel, a liquid header with a plurality of liquid connections, a vent header with a plurality of vent connections, and a crossover circuit in fluid communication with the liquid header and the vent header, the liquid and vent connections being connected to corresponding liquid and vent connections of respective ones of the ISO tank containers, where each of the control panels is in electrical communication with the central computer system via a respective communication line, where the crossover circuit includes one or more crossover valves for permitting or preventing fluid communication between the liquid header and the vent header, where the crossover valve(s) are coupled to the corresponding control panel via valve control lines and are remotely openable via control signals received through the control panel, the method further comprising:
sending a control signal from the central computer system to the crossover valve(s) of one or more of the LNG manifold apparatuses to open the crossover valve(s) and permit fluid communication between the liquid header and the vent header of the respective LNG manifold apparatus.

Embodiment 24. The method of Embodiment 23, further comprising:
 simultaneously filling with a cooling fluid the liquid header and the vent header of the LNG manifold apparatuses for which the crossover valves are open.

Embodiment 25. The method of Embodiment 24, where the cooling fluid comprises gaseous natural gas.

Embodiment 26. The method of any of Embodiments 24-25, where the cooling fluid is delivered to the LNG manifold apparatuses through their respective liquid headers.

Embodiment 27. The method of any of Embodiments 24-26, further comprising:
 sending a control signal from the central computer system to the crossover valve(s) of a first one of the LNG manifold apparatuses to close the crossover valve(s) and prevent fluid communication between the liquid header and the vent header of the first LNG manifold apparatus.

Embodiment 28. The method of Embodiment 27, where the crossover valve(s) of a second one of the LNG manifold apparatuses remains open.

Embodiment 29. The method of any of Embodiments 27-28, further comprising:
 delivering LNG to the liquid header of the first LNG manifold apparatus to fill ISO tank containers connected to the liquid connections of the first LNG manifold apparatus.

Embodiment 30. The method of Embodiment 28, further comprising:
 sending a control signal from the central computer system to the crossover valve(s) of a second one of the LNG manifold apparatuses to close the crossover valve(s) and prevent fluid communication between the liquid header and the vent header of the second LNG manifold apparatus.

Embodiment 31. The method of Embodiment 30, further comprising:
 delivering LNG to the liquid header of the second LNG manifold apparatus to fill ISO tank containers connected to the liquid connections of the second LNG manifold apparatus.

Embodiment 32. A method for cooling liquid and vent connections a plurality of liquid natural gas (LNG) manifold apparatuses connected to ISO tank containers on a marine vessel, the vessel having a central computer system, each of the LNG manifold apparatuses having a control panel, a liquid header with a plurality of liquid connections, a vent header with a plurality of vent connections, a drain header, and a crossover circuit in fluid communication with the liquid header and the drain header, the liquid and vent connections being connected to corresponding liquid and vent connections of respective ones of the ISO tank containers, where each of the control panels is in electrical communication with the central computer system via a respective communication line, where the crossover circuit includes one or more crossover valves for permitting or preventing fluid communication between the liquid header and the drain header, and where the crossover valve(s) are coupled to the corresponding control panel via valve control lines and are remotely openable via control signals received through the control panel, the method further comprising:
 sending a control signal from the central computer system to the crossover valve(s) of an LNG manifold apparatuses to open the crossover valve(s) and permit fluid communication between the liquid header and the drain header of the LNG manifold apparatus.

Embodiment 33. The method of Embodiment 32, where the control signal is sent in response to an emergency shutdown (ESD) valve of the LNG manifold apparatus closing to isolate the liquid header, such that opening the crossover valve(s) drains liquid from the liquid header.

Embodiment 34. The method of Embodiment 33, where the drain header is connected to a knockout drum.

The invention claimed is:

1. A method for simultaneously filling at least first and second pluralities of ISO tank containers on a marine vessel with liquid natural gas (LNG), each of the ISO tank containers having a tank liquid connection and a tank vent connection, the marine vessel having a central computer system, each plurality of ISO tank containers connected to a respective LNG manifold apparatus having a control panel, a plurality of manifold liquid connections, a plurality of manifold vent connections, the pluralities of manifold liquid connections and manifold vent connections being each connected to corresponding ones of the tank liquid connections and tank vent connections, where each of the control panels is in electrical communication with the central computer system via a respective communication line, where each LNG manifold apparatus includes a plurality of variable shutoff valves and a plurality of vent shutoff valves, each variable shutoff valve configured to throttle flow through one of the liquid connections of the LNG manifold apparatus, each vent shutoff valve configured to throttle flow through one of the vent connections of the LNG manifold apparatus, where the variable shutoff valves and vent shutoff valves are coupled to the corresponding control panel via valve control lines and are remotely actuatable via control signals received through the control panel, the method comprising:
 sending control signals from the central computer system to either or both of:
 the variable shutoff valve corresponding to a first one of the ISO tank containers and/or variable shutoff valve corresponding a second one of the ISO tank containers to vary one or more of the respective variable shutoff valves and thereby reduce flow into the first ISO tank container relative to flow into the second ISO tank container; and/or
 the vent shutoff valves corresponding to a first one of the ISO tank containers and/or the vent shutoff valve corresponding to a second one of the ISO tank containers to close one or more of the respective vent shutoff valves and thereby maintain or increase pressure in the second ISO tank container and increase flow into the first ISO tank container relative to flow into the second ISO tank container.

2. The method of claim 1, where sending the control signals is performed in response to determining that a fill level difference between the first ISO tank container and the second ISO tank container exceeds a threshold value.

3. The method of claim 2, where the first ISO tank container is one of the first plurality of ISO tank containers and the second ISO tank container is one of the second plurality of ISO tank containers.

4. The method of claim 1, where sending the control signals comprises sending control signals from the central computer system to the shutoff valves corresponding to the first ISO tank container, the second ISO tank container, and/or a third one of the ISO tank containers to vary one or more of the shutoff valves and thereby reduce flow into the second ISO tank container relative to flow into the third ISO tank container.

5. The method of claim 4, where the control signals are sent in response to determining that a fill level difference between the second ISO tank container and the third ISO tank container exceeds the threshold value during simultaneous filling of the first, second, and third ISO tank containers.

6. The method of claim 1, further comprising:
in response to determining that a fill level difference between any two of the first and second pluralities of ISO tank containers exceeds the threshold value during simultaneous filling of at least one of the first plurality of ISO tank containers and at least one of the second plurality of ISO tank containers, sending control signals to one of more of the shutoff valves to vary the respective shutoff valve(s) and thereby reduce flow into the ISO tank with a higher fill level of the two ISO tank containers for which the fill level difference was determined.

\* \* \* \* \*